US006353446B1

(12) United States Patent
Vaughn et al.

(10) Patent No.: US 6,353,446 B1
(45) Date of Patent: Mar. 5, 2002

(54) METHOD AND SYSTEM FOR INTEGRATED NETWORK MANAGEMENT APPLICATIONS

(75) Inventors: Leslie W. Vaughn, Saratoga; Zachary A. Nelson, San Mateo, both of CA (US)

(73) Assignee: Network Associates, Inc., Santa Clara, CA (US)

( * ) Notice: Subject to any disclaimer, the term of this patent is extended or adjusted under 35 U.S.C. 154(b) by 0 days.

(21) Appl. No.: 09/236,919

(22) Filed: Jan. 25, 1999

(51) Int. Cl.[7] .............................................. G06F 13/00
(52) U.S. Cl. ...................................... 345/733; 709/203
(58) Field of Search ............................... 345/326, 329, 345/333, 335, 336, 339, 348, 352, 354, 356, 357, 967, 969, 705, 700, 733, 741–744, 764, 765, 748, 769, 810, 835, 853, 854; 709/203, 223, 224

(56) References Cited

U.S. PATENT DOCUMENTS

| | | | | |
|---|---|---|---|---|
| 5,550,986 A | * | 8/1996 | Miller et al. ................. | 345/741 |
| 5,914,714 A | * | 6/1999 | Brown ......................... | 345/866 |
| 6,144,991 A | * | 11/2000 | England ..................... | 709/205 |
| 6,145,001 A | * | 11/2000 | Scholl et al. ................ | 709/223 |
| 6,177,932 B1 | * | 1/2001 | Galdes et al. ................ | 345/733 |
| 6,195,097 B1 | * | 2/2001 | Shrader et al. ............. | 345/804 |

OTHER PUBLICATIONS

"Sniffer Total Network Visibility" 1999, www.nai.com/products/network_visibility/network_visibility.asp Last update: Jan. 1999 Accessed on: Mar. 1, 1999.
"Sniffer Total Network Visibility Overview Brochure" 1999, www.nai.com/products/network_visibility/network_visibility2.asp Last update: Jan. 1999 Accessed on: Mar. 1, 1999.
"Sniffer Total Network Visibility" 1999 www.nai.com/products/network_visibility/tnv_overview.asp Last update: Jan. 1999 Accessed on: Mar. 1, 1999.
Network Associates, 1998, "Sniffer Total Network Visibility: End–to–end intelligence for optimizing performance and ensuring availability" brochure.
"Portable Analysis Suite" 1999 www.nai.com/products/network_visibility/pas.asp Last Update: Jan. 1999 Accessed on: Mar. 1, 1999.
"Sniffer basic (NetXRay)" 1999 www.nai.com/products/network_visibility/sniffer_basic/basic.asp Last Update: Jan. 1999 Accessed on: Mar. 1, 1999.
Network General, 1997, "A Cost–Effective, Real–Time Network Analysis and Monitoring Tool," *NetXray* brochure.
"Case Studies" 1999 www.nai.com/products/network_visibility/case_study.asp Last Update Jan. 1999 Accessed on: Mar. 1, 1999.

(List continued on next page.)

*Primary Examiner*—Crescelle N. dela Torre
(74) *Attorney, Agent, or Firm*—Pennie & Edmonds LLP

(57) ABSTRACT

A computer program product for assisting a service person in managing an enterprise network is described, wherein a browser-based help desk window may be invoked by the service person at any user computer on the enterprise network that is equipped with a web browser. The browser-based help desk window is customizable to each service person, allowing the service person to embed a network visibility link on an application launch toolbar contained in the browser-based help desk window. The service person may then subsequently log into a help desk server from any user computer equipped with a browser, and then launch a browser-based network visibility session upon activation of the embedded network visibility link. The user is permitted to embed the network visibility link onto the application toolbar, and to perform other browser-based help desk window customization tasks, using simple menu selection and drag-and-drop commands.

11 Claims, 31 Drawing Sheets

OTHER PUBLICATIONS

"White Paper Protocols and Poster Order Form" 1999 www.nai.com/products/network_visibility/whitepapers.asp Last Update Jan. 1999 Accessed on: Mar. 1, 1999.

"Network Visibility" 1999 www.nai.com/about/news/press/press_netvis.asp Last Update: Jan. 1999 Accessed on: Mar. 1, 1999.

Network General Corporation, 1997, "Unix and Windows NT reporting solutions for troubleshooting, monitoring, and baseline clinet/server networks" *Reporter* brochure.

"Sniffer Network Analyzer" 1999 www.nai.com/products/network_visibility/sniffer_Ian/sna_overview.asp Last Updated: Jan. 1999 Accessed on: Mar. 1, 1999.

"Sniffer Network Analyzer Ethernet" 1999 www.nai.com/products/network_visibility/sniffer_Ian/s_nae.asp Last Updated: Jan. 1999 Accessed on: Mar. 1, 1999.

"Sniffer FDDI" 1999 www.nai.com/products/network_visibility/sniffer_Ian/s_fddi.asp Last Updated: Jan. 1999 Accessed on: Mar. 1, 1999.

"Sniffer Internetwork Analyzer" 1999 www.nai.com/products/network_visibility/sniffer_wan/s_ia.asp Last Updated: Jan. 1999 Accessed on: Mar. 1, 1999.

"Sniffer WAN Notebook" 1999 www.nai.com/products/network_visibility/sniffer_wan/s_wan. asp Last Updated: Jan. 1999 Accessed on: Mar. 1, 1999.

"Sniffer HSSI" 1999 www.nai.com/products/network_visibility/sniffer_wan/s_hssi.asp Last Updated: Jan. 1999 Accessed on: Mar. 1, 1999.

"Sniffer ISDN" 1999 www.nai.com/products/network_visibility/sniffer_wan/s_isdn. asp Last Updated: Jan. 1999 Accessed on: Mar. 1, 1999.

"Sniffer Pro '98 High Speed: ATM OC-3 Analyzer" 1999 www.nai.com/products/network_visibility/sniffer_speed/s_atm.asp Last Updated: Jan. 1999: Accessed on: Mar. 1, 1999.

Network Associates, Inc., "Gigabit Ethernet Analyzer" Product Specifications V1.0 and "ATMbook and ATM Sniffer Pro" Product Specification.

"Distributed Analysis Suite" 1999 www.nai.com/products/network_visibility/das.asp Last Updated: Jan. 1999 Accessed on: Mar. 1, 1999.

"Sniffer Basic (Distributed NetXRay)" 1999 www.nai.com/products/network_visibility/sniffer_dept/s_dist. asp Last Updated: Jan. 1999 Accessed on: Mar. 1, 1999.

"Distributed Sniffer System*/RMON" 1999 www.nai.com/products/network_visibility/sniffer_campus/dss_rmon_pro.asp Last Updated: Jan. 1999 Accessed on: Mar. 1, 1999.

"SniffMaster for Windows" 1999 www.nai.com/products/network_visibility/sniffer_campus/sm_windows.asp Last Updated: Jan. 1999 Accessed on: Mar. 1, 1999.

"SniffMaster for UNIX" 1999 www.nai.com/products/network_visibility/sniffer_campus/sm_unix.asp Last Updated: Jan. 1999 Accessed on: Mar. 1, 1999.

"Distributed Sniffer (DSS) Ethernet" 1999 www.nai.com/products/network_visibility/sniffer_campus/dss_ethernet.asp Last Updated: Jan. 1999 Accessed on: Mar. 1, 1999.

"Distributed Sniffer System Token Ring" 1999 www.nai.com/products/network_visibility_campus/dss_token_ring.asp Last Updated: Jan. 1999 Accessed on: Mar. 1, 1999.

"Distributed Sniffer System FDDI" 1999 www.nai.com/products/network_visability/sniffer_campus/dss_fddi.asp Last Updated: Jan. 1999 Accessed on Mar. 1, 1999.

"Distributed Sniffer System ISDN" 1999 www.nai.com/products/network_visibility/sniffer_campus/dss_isdn.asp Last Updated: Jan. 1999 Accessed on: Mar. 1, 1999.

"Distributed Sniffer System" 1999 www.nai.com/products/network_visibilty/sniffer_campus/dss_overview.asp Last Updated: Jan. 1999 Accessed on: Mar. 1, 1999.

"RouterPM" 1999 www.nai.com/products/network_visibility/sniffer_dept/s_rpm.asp Last Updated: Jan. 1999 Accessed on: Mar. 1, 1999.

"Total Service Desk" 1999 www.nai.com/products/helpdesk/helpdesk.asp Last Updated: Jan. 1999 Accessed on: Mar. 1, 1999.

"McAfee Helpdesk" 1999 www.nai.com/products/helpdesk/mhs/mcafee_helpdesk.asp Last Updated: Jan. 1999 Accessed on: Mar. 1, 1999.

"Customer Case Studies" 1999 www.nai.com/products/helpdesk/cs/cs.asp Last Updated: Jan. 1999 Accessed on: Mar. 1, 1999.

"AT&T Wireless Keeps Cell-Calls Connected With McAfee HelpDesk" 1999 www.nai.com.products/helpdesk/cs/att.asp Last Updated: Jan. 1999 Accessed on: Mar. 1, 1999.

"American Management Systems Relies on McAfee HelpDesk for Internal Support" 1999 www.nai.com/products/helpdesk/cs/ams.asp Last Updated: Jan. 1999 Accessed on: Mar. 1, 1999.

"McAfee HelpDesk Supports Cellular One System" 1999 www.nai.com/products/helpdesk/cs/cel.asp Last Updated: Jan. 1999 Accessed on: Mar. 1, 1999.

"McAfee HelpDesk Delivers the Goods For Certified Grocers" 1999 www.nai.com/products/helpdesk/cs/cq.asp Last Updated: Jan. 1999 Accessed on: Mar. 1, 1999.

"Frontier Communications Keeps Calls Flowing with McAfee HelpDesk" 1999 www.nai.com/products/helpdesk/cs/fc.asp Last Updated: Jan. 1999 Accessed on: Mar. 1, 1999.

"Roadshow International Keeps Customer Products Shipping With McAfee HelpDesk" 1999 www.nai.com/products/helpdesk/cs/ri.asp Last Updated: Jan. 1999 Accessed on: Mar. 1, 1999.

"SatoTravel Finds International Benefits in McAfee HelpDesk" 1999 www.nai.com/products/helpdesk/cs/sato.asp Last Updated: Jan. 1999 Accessed on: Mar. 1, 1999.

"SEI Investments Company Banks on McAfee HelpDesk to Track Support Activities" 1999 www.nai.com/products/helpdesk/cs/sei.asp Last Updated: Jan. 1999 Accessed on: Mar. 1, 1999.

"Service Desk" 1999 www.nai.com/about/news/press/press_servicedesk.asp Last Updated: Jan. 1999 Accessed on: Mar. 1, 1999.

"City of Austin Increases Efficiency of Computer Support, Standardizing on Network Associates Total Service Desk" 1999 www.nai.com/about/news/press/1998/december/120998.asp Last Updated: Jan. 1999 Accessed on: Mar. 1, 1999.

"Network Associates' HelpDesk Implemented by BankBoston" 1999 www.nai.com/about/news/press/1998/february/021798c.asp Last Updated: Jan. 1999 Accessed on: Mar. 1, 1999.

"Network Associates Acquires Magic and Sets Compelling Strategy for Help Desk Solutions" 1998 www.nai.com/about/news/press/1998/august/081798a.asp Last Updated: Jan. 1999 Accessed on: Mar. 1, 1999.

"Network Associates Previews Merlin Next Generation Browser–Based Service Desk" 1999 www.nai.com/about/news/press/1998/august/081098a.asp Last Updated: Jan. 1999 Accessed on: Mar. 1, 1999.

"McAfee Extends Leadership With New HelpDesk Release" 1999 www.nai.com/about/news/press/1997/090297b.asp Last Updated: Jan. 1999 Accessed on: Mar. 1, 1999.

"ServiceDesk White Papers" 1999 www.nai.com/services/support/whitepapers/service_desk/ Last Updated: Jan. 1999 Accessed on: Mar. 1, 1999.

McAfee, 1996, "Empowering the Help Desk" White Paper.

"McAfee ServiceDesk & Hewlett–Packard Open View" 1999 www.nai.com/services/support/whitepapers/service_desk/msd_hpov.asp Last Updated: Jan. 1999 Accessed on: Mar. 1, 1999.

"McAfee ServiceDesk & Tivoli TME 10" 1999 www.nai.com/services/support/whitepapers/service_desk/msd_tme.asp Last Updated: Jan. 1999 Accessed on: Mar. 1, 1999.

Mustacchio, "Reducing Software Expenditures Through Effective Metering" White Paper.

Network Associates, Inc., 1998, "McAfee HelpDesk Suite".

"Zero Administration Client (ZAC) Suite" 1999 www.nai.com/products/helpdesk/zac/zac.asp Last Updated: Jan. 1999 Accessed on: Mar. 1, 1999.

"Analyst Spotlight" 1999 www.nai.com/products/helpdesk/zac_cs/zacmain.asp Last Updated: Jan. 1999 Accessed on: Mar. 1, 1999.

"Landis & Gyr Turns to McAfee ZAC Suite to Streamline Network Management" 1999 www.nai.com/products/helpdesk/zac_cs/landis.asp Last Updated: Jan. 1999 Accessed on: Mar. 1, 1999.

"McAfee's ZAC Suite Keeps Low Costs on Canada's Menu" 1999 www.nai.com/products/helpdesk/zac_cs/casehrd.asp Last Updated: Jan. 1999 Accessed on: Mar. 1, 1999.

"McAfee's ZAC Suite Keeps the Mutual Fund Boom Rolling" 1999 www.nai.com/products/helpdesk/zac_cs/casefps.asp Last Updated: Jan. 1999 Accessed on: Mar. 1, 1999.

"Johnson & Johnson's LifeScan Unit Manages Huge Macintosh–to–PC Conversion with McAfee ZAC Suite" 1999 www.nai.com/products/helpdesk/zac_cs/caselife.asp Last Updated: Jan. 1999 Accessed on: Mar. 1, 1999.

"Provident Bank Manages Acquisitions and Growth with McAfee Zac Suite" 1999 www.nai.com/products/helpdesk/zac_cs/caseprove.asp Last Updated: Jan. 1999 Accessed on: Mar. 1, 1999.

"Saber LAN Workstation is LCI International's Secret Cost–Cutting Weapon" 1999 www.nai.com/products/helpdesk/zac_cs/testim.asp Last Updated: Jan. 1999 Accessed on: Mar. 1, 1999.

"Tosco Adds Hundreds of Thousands to Bottom Line With Saber LAN Workstation" 1999 www.nai.com/products/helpdesk/zac_cs/testim2.asp Last Updated: Jan. 1999 Accessed on: Mar. 1, 1999.

"Service Desk"1999 www.nai.com/about/news/press_servicedesk.asp Last Updated: Jan. 1999 Accessed on: Mar. 1 1999.

"Network Associates Releases Latest Version of Zero Administration Client (ZAC) Suite" 1998 www.nai.com/about/news/press/1998/june/062598a.asp Last Updated: Jan. 1999 Accessed on: Mar. 1, 1999.

"Network Associates Releases iZAC" 1998 www.nai.com/about/news/press/1998/april/040698.asp Last Updated: Jan. 1999 Accessed on: Mar. 1, 1999.

"Network Associates Licenses Award–Winning ZAC Technology" 1998 www.nai.com/about/news/press/1998/june/061798.asp Last Updated: Jan. 1999 Accessed on: Mar. 1, 1999.

Network Associates, 1998, "Zero Administration Client (ZAC) Suite" Total Service Desk.

"ZAC 2001" 1999 www.nai.com/products/helpdesk/zac2001/zac2001.asp Last Updated: Jan. 1999 Accessed on: Mar. 1, 1999.

"Analyst Spotlight"1999 www.nai.com/products/helpdesk/zac cs/zacmain.asp Last Updated: Jan. 1999 Accessed on Mar. 1, 1999.

"AberdeenGroup Impact: Network Associates' ZAC 2001—a Tactical Tool for Today, a Strategic Solution for Tomorrow" 1999 www.nai.com/products/helpdesk/zac_cs/aberdeen/0199zac.asp Last Updated: Jan. 1999 Accessed on: Mar. 1, 1999.

"AberdeenGroup Impact: Network Associates' Zac 2001—a Tactical Tool for Today, a Strategic Solution for Tomorrow" AberdeenGroup 1999.

"Network Associates' ZAC 2001 Protects and Manages Enterprise Desktops Into the New Millennium" 1999 www.nai.com/about/news/press/1999/january/011899a.asp Last Updated: Jan. 1999 Accessed on: Mar. 1, 1999.

Network Associates, 1999 "ZAC 2001: Enterprise–Class Desktop Management and Y2K Risk Assessment" Total Service Desk.

"McAfee Self Service Desk" 1998 www.nai.com/products/helpdesk/ssd/ssd.asp Last Updated: Jan. 1999 Accessed on: Mar. 1, 1999.

Network Associates, 1998, "McAfee Self ServiceDesk".

"Informant: Visual Metrics for Success" 1999 www.nai.com/products/helpdesk/informant/informant.asp Last Updated: Jan. 1999 Accessed on: Mar. 1, 1999.

Network Associates, 1999, "Informant: Visual Metrics for Success".

* cited by examiner

METHOD AND SYSTEM FOR INTEGRATED NETWORK MANAGEMENT APPLICATIONS

FIELD OF THE INVENTION

The present invention relates to the field of computer networks. In particular, the present invention relates to software for managing enterprise networks and for assisting the users thereof.

BACKGROUND OF THE INVENTION

The expense of managing an enterprise network can be staggering. Enterprise networks, as described in Sheldon, *The Encyclopedia of Networking*, Osbourne/McGraw-Hill (1998), the contents of which are incorporated by reference into the present application, are generally both local and wide area in scope, and serve to connect the departmental or workgroup networks of an organization into an intracompany network with the potential for allowing computer users in a company to access any data or computing resource. According to one statistic appearing on the World Wide Web site of Network Associates, Inc, the entirety of which is hereby incorporated by reference as of the filing date of the present application, the average five year cost of provisioning and maintaining a networked personal computer is more than $65,000.

FIG. 1 shows a diagram of an enterprise network 100 in which one or more service personnel 102a, 102b, etc., provision and maintain the hardware and software therein and assist users with problems as they arise, and which is amenable to a system and method for integrated network management applications in accordance with the preferred embodiments. It is to be understood that the term service personnel as used herein generally refers to any person involved in the provisioning, maintenance, or user assistance associated with the enterprise network 100, such persons having any of a variety of titles including, but not limited to, system administrator, computer technician, software engineer, network engineer, help desk engineer, help desk clerk, or other titles.

Enterprise network 100 comprises a plurality of local area networks 104, 106, 108, and 110. Local area network 104 may correspond, for example, to a finance department of a corporation, while local area network 106 may correspond, for example, to an engineering department. Local area network 108 may correspond, for example, to an off-site marketing department that is coupled to the remainder of the enterprise network 100 through the Internet 112 and gateway devices 114 and 116, respectively. Finally, local area network 110 is shown in FIG. 1 as corresponding to the system administration department of a corporation, containing equipment and personnel for provisioning, maintaining, and assisting users on the enterprise network 100. It is to be appreciated that the enterprise network 100 represents only one sample of a virtually unlimited number of configurations of enterprise networks amenable to the preferred embodiments described herein.

As shown in FIG. 1, local area network 104 is a token ring network to which is coupled user computers 118 and 120, local area network 106 is an Ethernet network to which is coupled user computers 122, 124, and 126, and a file server 127, and local area network 108 is an Ethernet network to which is coupled user computers 128 and 130. Local area networks 104 and 106 are coupled to the remainder of the enterprise network through routers 132 and 134, respectively.

Various network management tools have been made available to assist the service personnel 102a, 102b, etc. in provisioning, maintaining, and assisting users in the enterprise network environment. As a first example, help desk tools have become available for assistance in resolving, recording, and tracking user troubles. As a second example, administration tools have become available for assisting in the tracking and management of hardware inventory, software inventory and distribution, software metering, and menuing. Finally, as a third example, network visibility tools have become available for assistance in analyzing, monitoring, and troubleshooting data communications problems.

Local area network 110 is an Ethernet network to which is coupled computer systems and other hardware for provisioning, maintaining, and assisting users on the enterprise network 100. In particular, a help desk server 136, an administration server 138, a network visibility server 140, a network visibility console 142, and help desk terminals 144 and 146 are coupled to local area network 110. Network visibility agent computers 148, 150, and 152 are coupled to the local area networks 104, 106, and 108, respectively, for gathering network visibility data and communicating this data to network visibility server 140. As indicated supra, the enterprise network 100 represents only one sample of a virtually unlimited number of configurations of enterprise networks, and it is not required that the above network management computer systems be coupled to a single local area network. For example, the help desk server 136 or the administration server 138 could just as well be connected to local area networks 104, 106, or other local area networks (not shown) of the enterprise network 100 without departing from the scope of the preferred embodiments. Furthermore, the network visibility agent computers 148, 150, and 152 may not be required to be separate computers but may rather correspond to applications loaded onto one or more of the user computers, e.g., where the local user is a local system administrator. Thus, there may be a virtually unlimited number of configurations of the enterprise network 100, help desk devices 136, 144, and 146, administration server 138, and network visibility devices 140, 142, 148, 150, and 152 that are possible and that are amenable to a system and method for integrated network management applications in accordance with the preferred embodiments described infra, provided that there is a requirement for service personnel 102a and 102b and for applications for providing assistance in help desk, administration, and network visibility functionalities.

An exemplary help desk tool for use by the service personnel 102a, 102b, etc. is McAfee HelpDesk™, currently available from Network Associates, Inc. As described in the McAfee HelpDesk user manual for v. 3.50, Mar. 31, 1998, the contents of which are hereby incorporated by reference, McAfee HelpDesk™ comprises a Help Desk Client for loading onto help desk computers 144 and 146, a Help Desk Database Administrator for loading onto help desk server 136, and other optional components for providing help desk functionality. McAfee HelpDesk helps to automate the process of entering caller information, e.g. when the service person enter a caller's name, for example, all other relevant fields are filled in automatically. Important information about the caller is also displayed automatically. If a caller has open trouble tickets, a pop-up window advising of this is shown at the outset. McAfee HelpDesk is fully integrated with industry standard problem resolution technologies, such as Inference Corporation's case-based reasoning engine and knowledge-base tools. A White Board feature allows easy management of widespread problems by posting the problem on a white board. When users call with that problem, a click on the white board generates a trouble ticket for that user. There is no need to manually log multiple tickets. When the problem is resolved, all linked trouble tickets are closed automatically. Detailed reports then help the service personnel measure the true impact of the problem.

An exemplary administration tool for use by the service personnel 102a, 102b, etc. is McAfee Zero Administration Client (ZAC) Suite™, which is currently available from Network Associates, Inc. As described at the Network Associates World Wide Web Site and in the McAfee ZAC Suite™ user manual for v. 6.21, Jun. 26, 1998, the contents of which are hereby incorporated by reference, McAfee ZAC Suite™ loads onto administration server 138 and provides tools for hardware and software inventory, software distribution, configuration, menuing, and locking down of desktops across the enterprise network, metering of software usage, and generation of reports on these tasks. The ZAC Suite may be run from a dedicated console computer or from another terminal such as help desk terminals 144 or 146 that are logged into the administration server 138. ZAC Suite also provides Remote Desktop Control functionality that allows viewing, controlling, and communication with user computers 118–130 over the enterprise network 100.

An exemplary network visibility tool for use by the service personnel 102a, 102b, etc. is the Distributed Sniffer System® and its associated console application Sniff master® for Windows, currently available from Network Associates, Inc. As described in the associated users manuals for the current versions of Distributed Sniffer System®, Distributed Sniffer Pro®, and Sniff master® for Windows, (hereinafter referred to as network visibility software), the contents of which are hereby incorporated by reference, network visibility software loads onto network visibility server 140 and also comprises remote agents that are loaded onto the network visibility agent computers 148, 150, and 152. Network visibility software compiles and displays information on network activity from the data-collecting network visibility agents 148, 150, and 152. Service personnel can access this information through a Windows-based application or other interface. Network visibility software provides flexible access to information from both local and remote client/server networks, providing a central control point from which to manage traffic on distributed networks. Network visibility software assists in explaining possible causes for network problems, collects expert analysis data automatically based on user-specified time intervals and data parameters, learns network configurations continuously, shows breakdown of network protocol activity automatically, displays network errors, frame size, and station statistics for specified stations, enables creation and generation of management reports, consolidates information from remote sites at a central location, points out problems proactively by communicating alarms to a central location, displays multiple windows concurrently allowing the service person to view prioritized alarms, global statistics, traffic statistics, and expert analysis information from one or several servers simultaneously. On the network visibility console 142, network visibility software consolidates and displays network intelligence from the distributed network visibility agents 148, 150, and 152, providing a central point of control for the enterprise network 100.

FIG. 2 shows a flowchart related to a problem that may occur in systems according to the prior art when a service person using the help desk software package requires fast and easy access to the network visibility software. At step 204, the service person opens a help desk ticket using the help desk application software described supra. At step 206, using troubleshooting techniques, using a prescription by an expert system associated with the help desk software, or using other means, the service person determines whether the problem is related to network visibility (e.g. traffic congestion problem, timeouts, nodes unreachable, or any other problem related to network visibility). If not associated with network visibility, the problem is resolved with assistance from the help desk software, administrative software, or other software as necessary at step 208 and the trouble ticket is closed at step 210.

If the problem is related to network visibility software, it is then determined whether the service person has access to a network visibility console application at their current computer terminal. If the network visibility console application is not available to the service person, the inconvenient task at step 214 must be undertaken, in which the service person must physically locate a computer terminal having a network visibility console application installed, or must install the network visibility console package. Following this step, the network visibility console application is instantiated at step 216. After these steps are performed, the problem may be resolved at step 218 and the trouble ticket closed at step 220.

The prior art example of FIG. 2 represents an inconvenience to the service person in the event that the network visibility console application is not available at their current computer terminal. This may be the case for several reasons. For example, the service person may have traveled over to the troubled workstation of the end user, which generally will not have the network visibility console application loaded. Even if the service person is at their own terminal, they may not have the network visibility console package loaded on their own terminal for hard disk space reasons, licensing reasons, or other reasons. Moreover, even if the network visibility console package is present, the launching of a separate set of software routines into computer memory at step 216 other than the help desk and/or administration software represents an additional source of delay depending on the capabilities of the current terminal.

Other shortcomings with prior art network management software includes need to constantly upgrade the help desk terminals 144 and 146 as new help desk, administration, and/or network visibility console software becomes available. Additionally, the installation of the new help desk, administration, and/or network visibility console software takes up valuable room on the hard drives of these machines.

Accordingly, it would be desirable to provide a computer program product that allows service personnel to seamlessly access and manipulate administration data, help desk data, and network visibility data from any user workstation on an enterprise network without requiring the presence of resident network management software on the user workstation.

It would be further desirable to provide a computer program product that allows each service person in an organization to have a customized service desk interface that may be launched at any user workstation on the enterprise network.

It would be still further desirable to provide a computer program product that allows for easy customization of the service desk interface by the service person, and that allows for easy linking of new network management applications to the service desk interface as the new network management applications become available for use.

SUMMARY OF THE INVENTION

In accordance with a preferred embodiment, a computer program product is provided for assisting a service person in managing an enterprise network, wherein a browser-based help desk window may be invoked by the service person at any user computer on the enterprise network that is equipped with a web browser. The browser-based help desk window is customizable to each service person, allowing the service person to embed a network visibility link on an application launch toolbar contained in the browser-based help desk window. The service person may then subsequently log into a help desk server from any user computer equipped with a browser, and then launch a browser-based network visibility session upon activation of the embedded network visibility link.

In a preferred embodiment, the browser-based help desk window comprises a plurality of trouble information fields for entering data related to client trouble calls, along with an application toolbar for displaying application launch buttons. The user is permitted to embed the network visibility link onto the application toolbar using menu selection and drag-and-drop commands. During the customization process, additional application launch buttons associated with other network management applications and/or servers may be embedded into the application toolbar, including an administration software launch button, a remote control launch button, and a knowledge base application launch button.

DETAILED DESCRIPTION OF THE INVENTION

Figure 1:
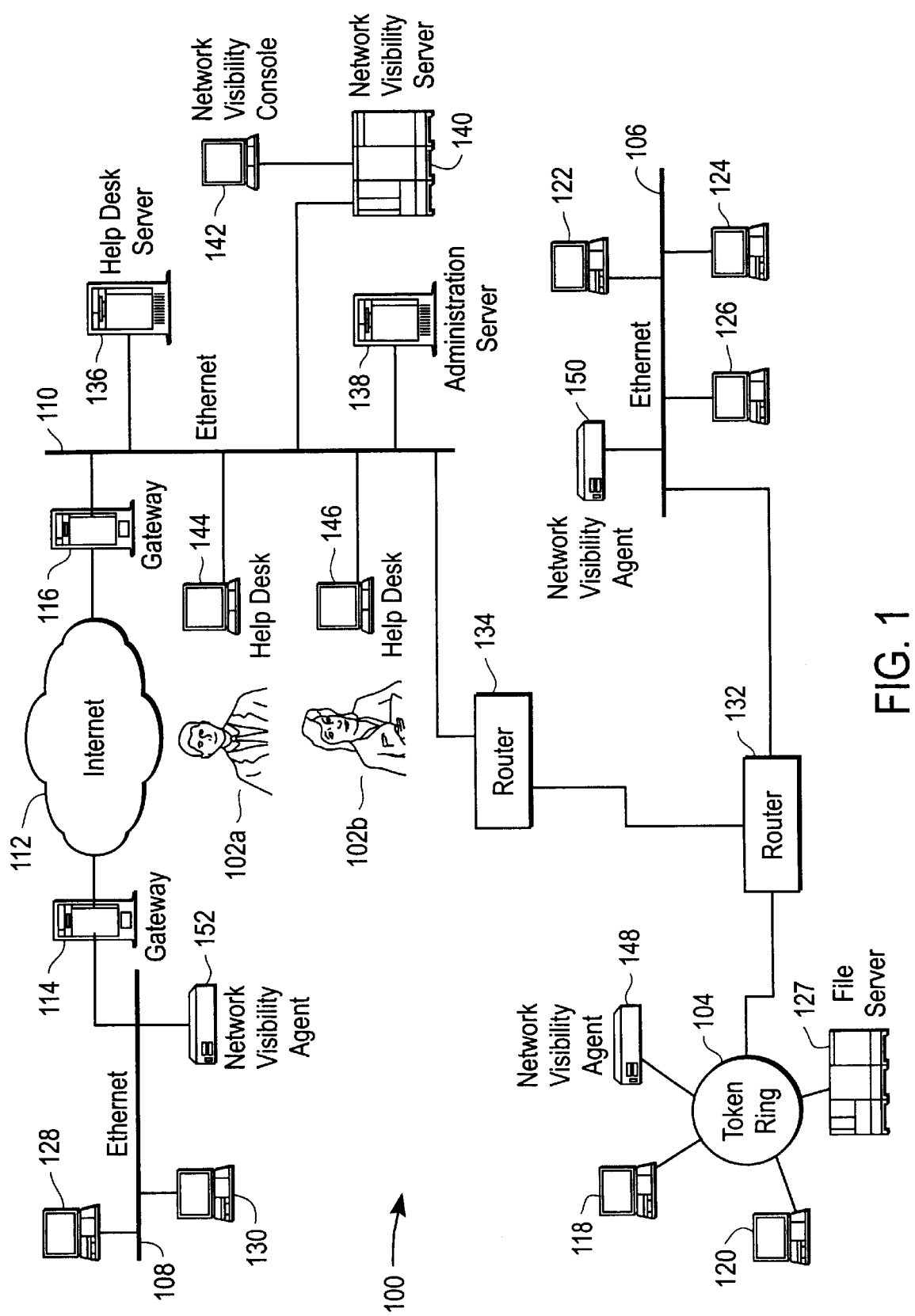
FIG. 1 shows a diagram of an enterprise network.
Figure 2:
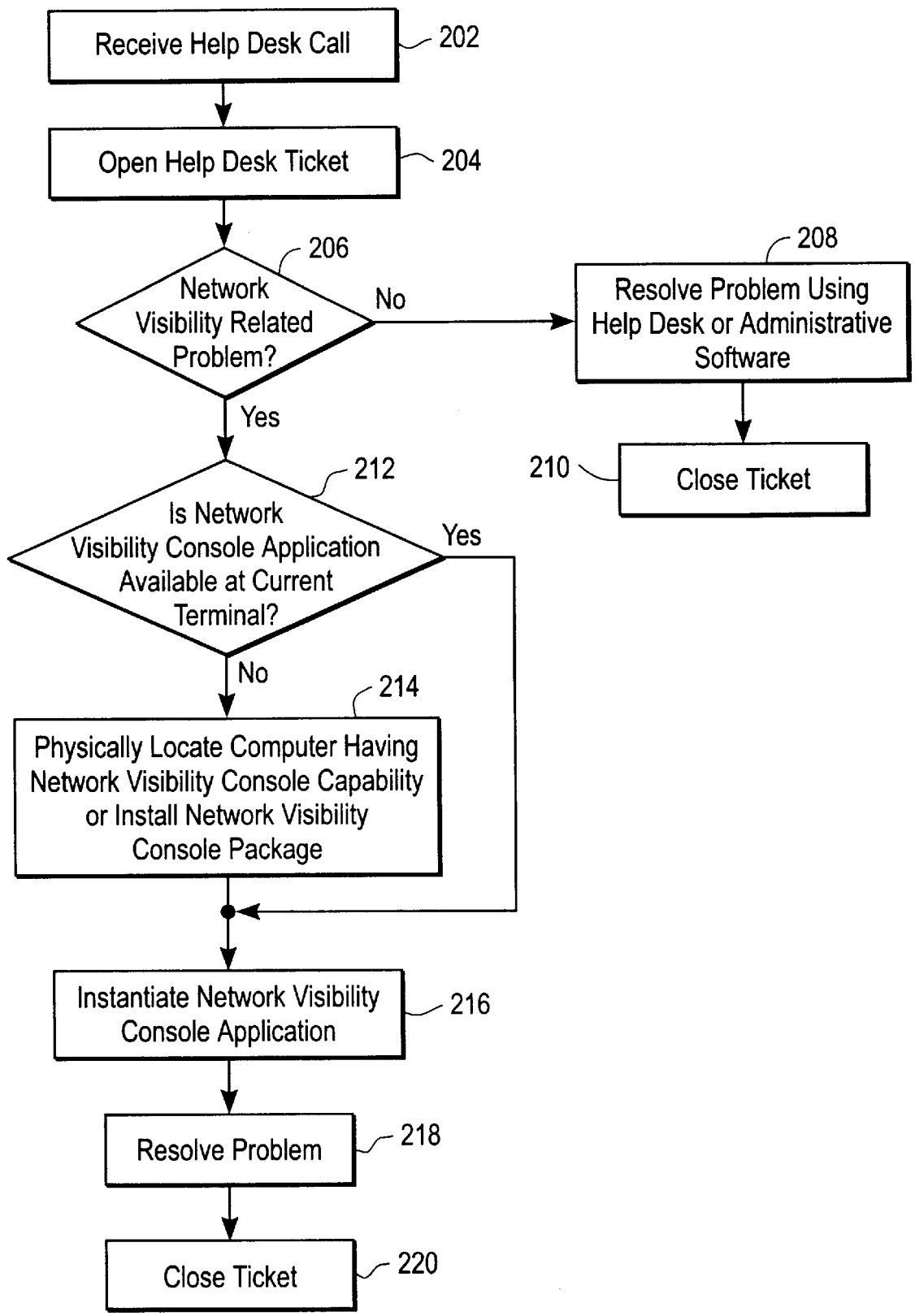
FIG. 2 shows a trouble resolution flowchart in accordance with the prior art.
Figure 3:
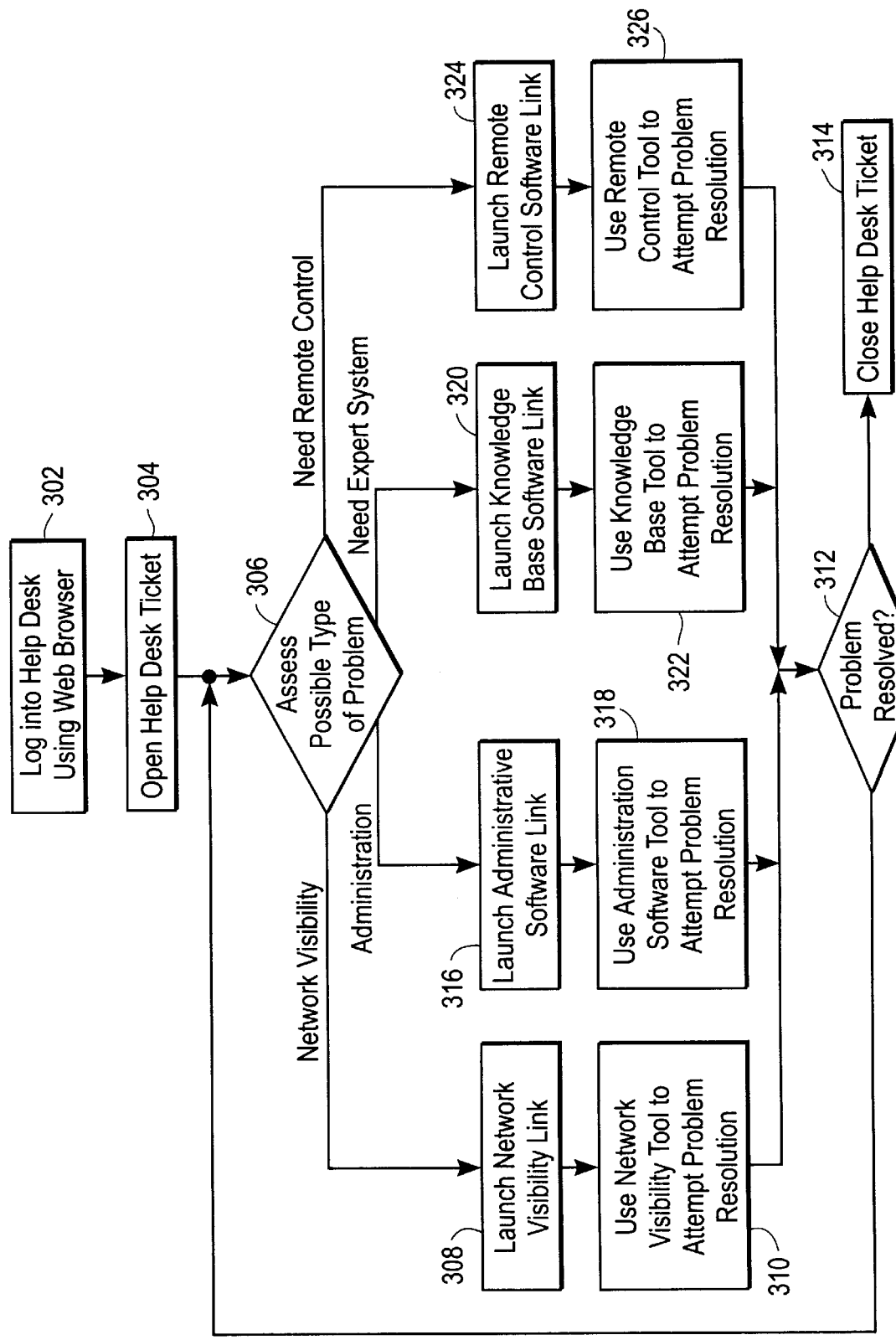
FIG. 3 shows steps for using a integrated browser-based network management application in accordance with a preferred embodiment.
Figure 4:
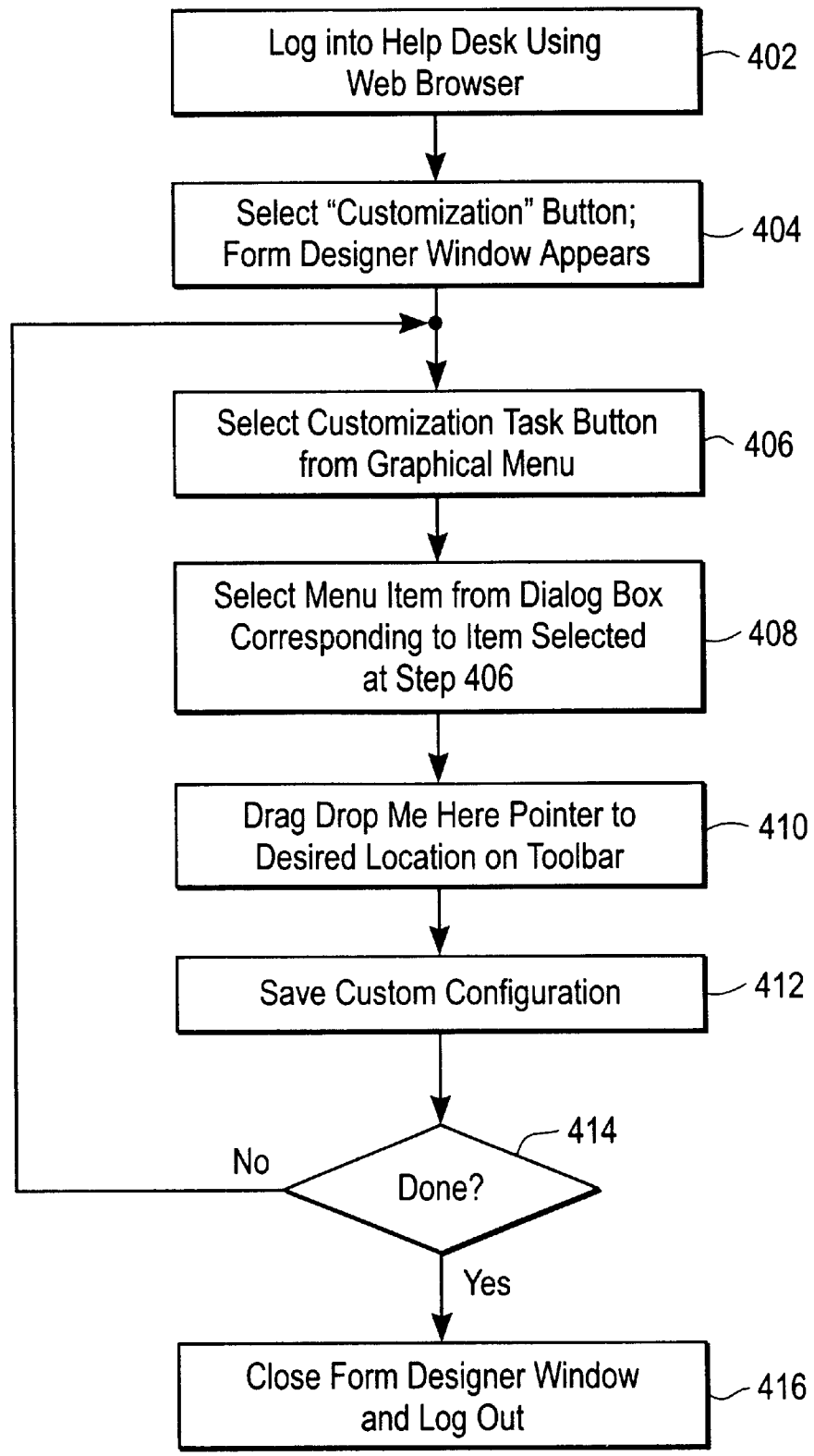
FIG. 4 shows steps for customizing a browser-based network management application interface by embedding a network visibility console application therein in accordance with a preferred embodiment.

FIG. 3 shows steps for using a integrated browser-based network management application in accordance with a preferred embodiment, while FIG. 4 shows steps for customizing a browser-based network management application interface by embedding a network visibility console application therein in accordance with a preferred embodiment. In conjunction with the software functionality description provided in the present disclosure, a system in accordance with the preferred embodiments may be programmed using methods known in the art as described, for example, in Homer & Ullman, *Instant IE4 Dynamic HTML Programmer's Reference*, Wrox Press (1997), Francise et. al., *Professional Active Server Pages* 2.0, Wrox Press (1998), and Zaration, *Microsoft C++6.0 Programmer's Guide*, Microsoft Press (1998), the contents of each of which is hereby incorporated by reference into the present application. Although the specific configurations may vary without departing from the spirit and scope of the preferred embodiments, the host software for providing browser-based help desk windows, as well as for communicating with other servers such as administration server 138 and network visibility server 140 is usually loaded and integrated with the help desk server software on:help desk server 136. Advantageously, it is not required that help desk terminals 144 and 146 be loaded with specific resident network management software, and are only required to be equipped with a standard web browser such as Microsoft Internet Explorer 4.0 or better.

Figure 5:
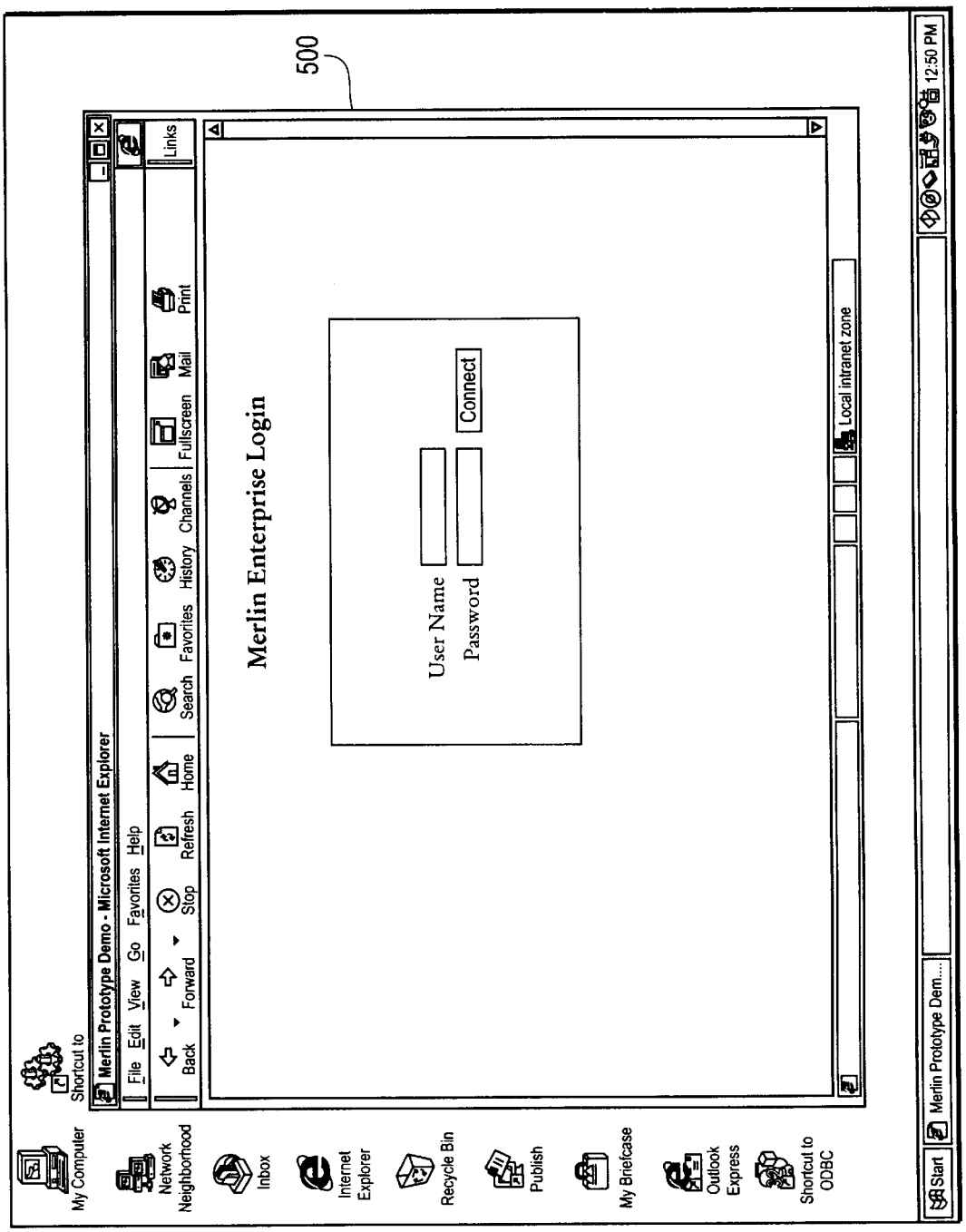
FIGS. 5–22 show windows corresponding to the steps of FIG. 3.
Figure 6:
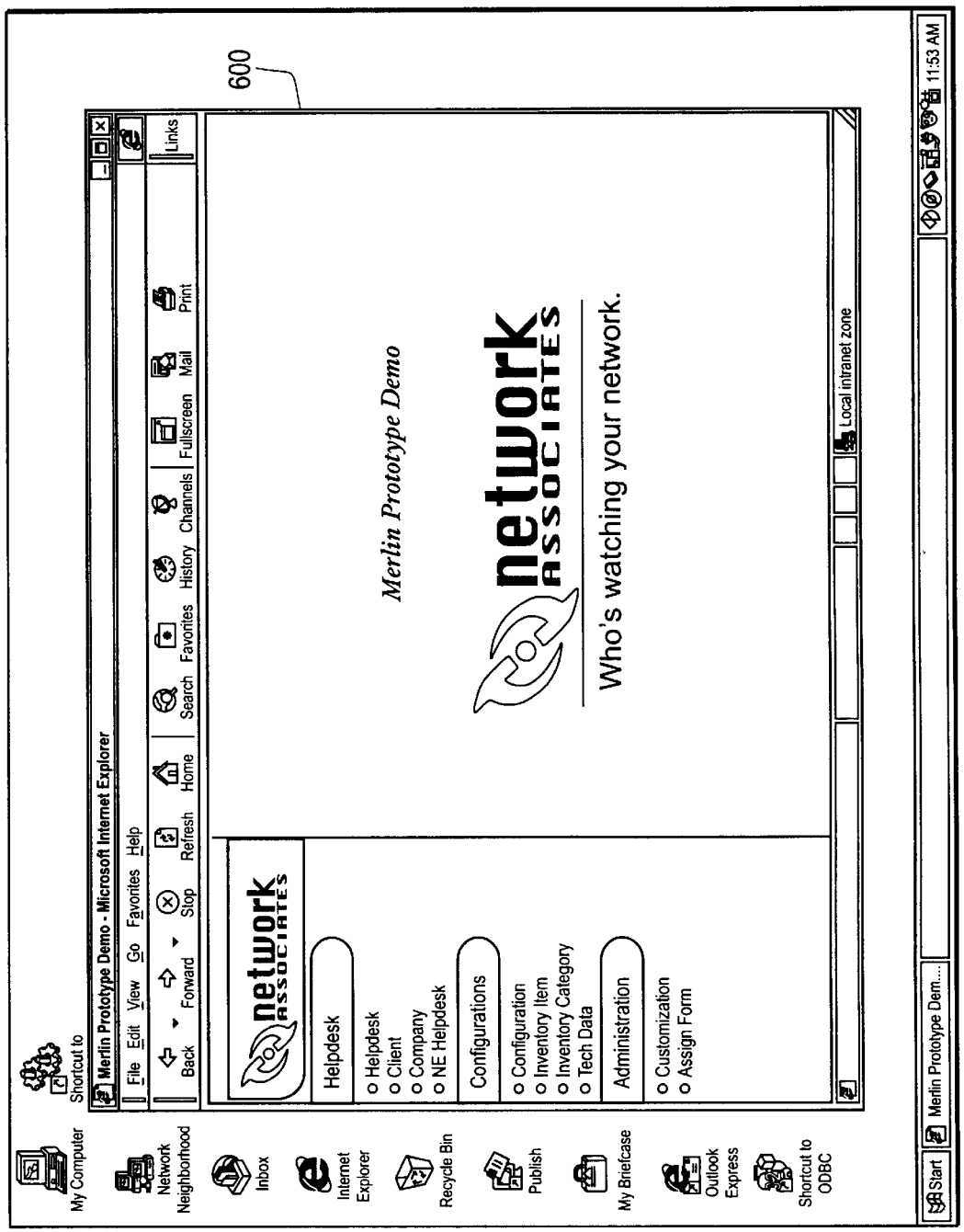
Figure 7:
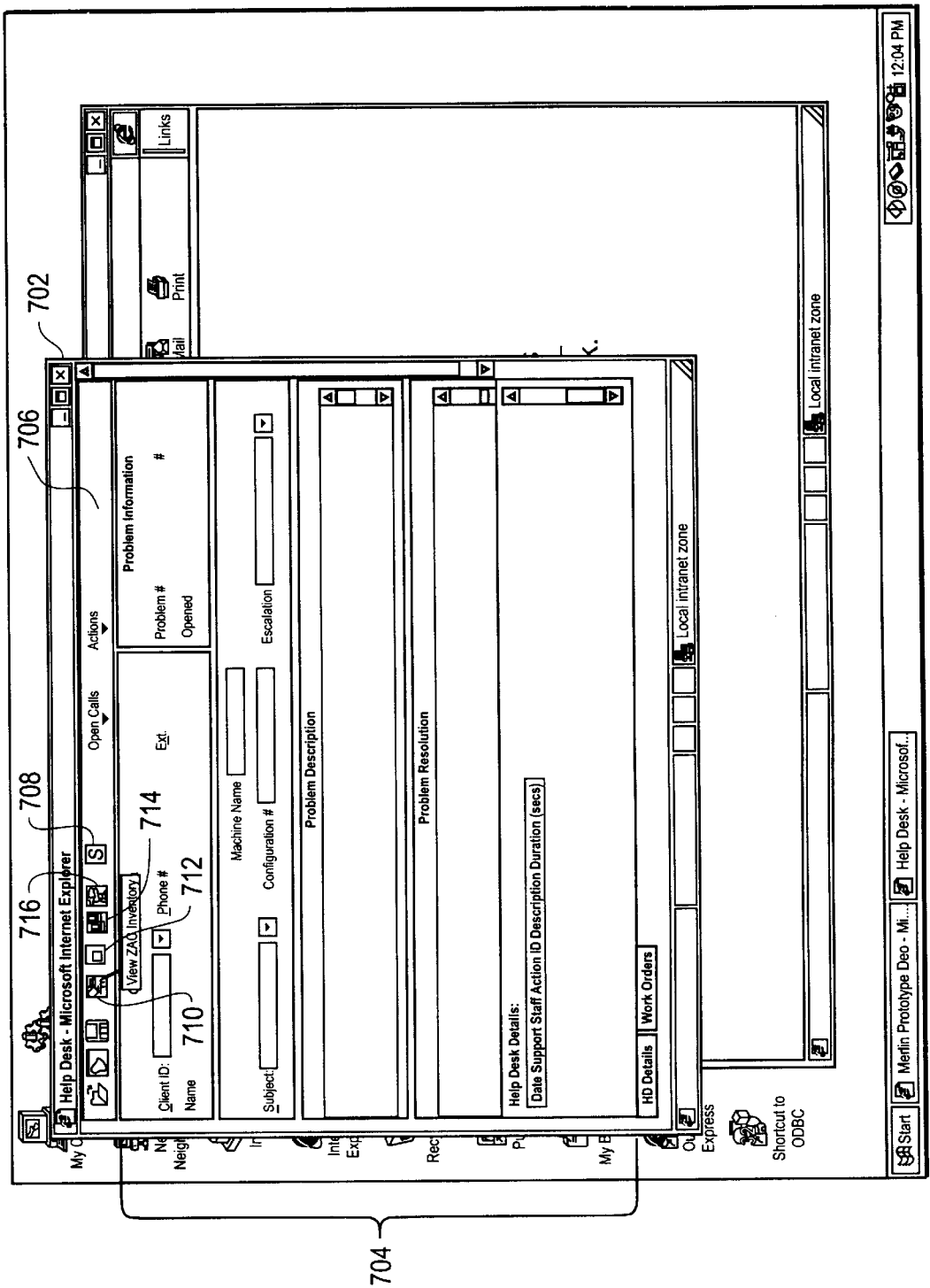
Figure 8:
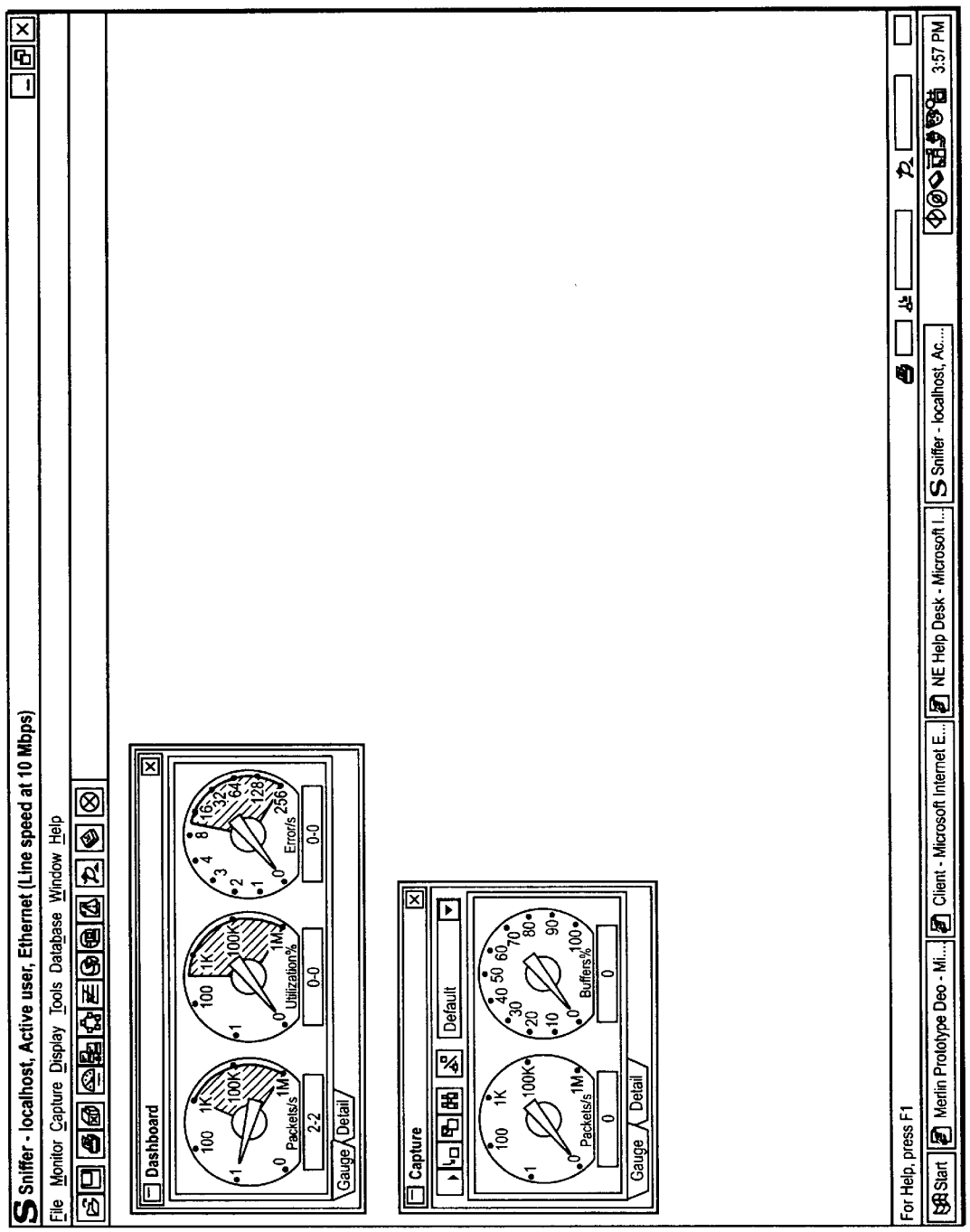
Figure 9:
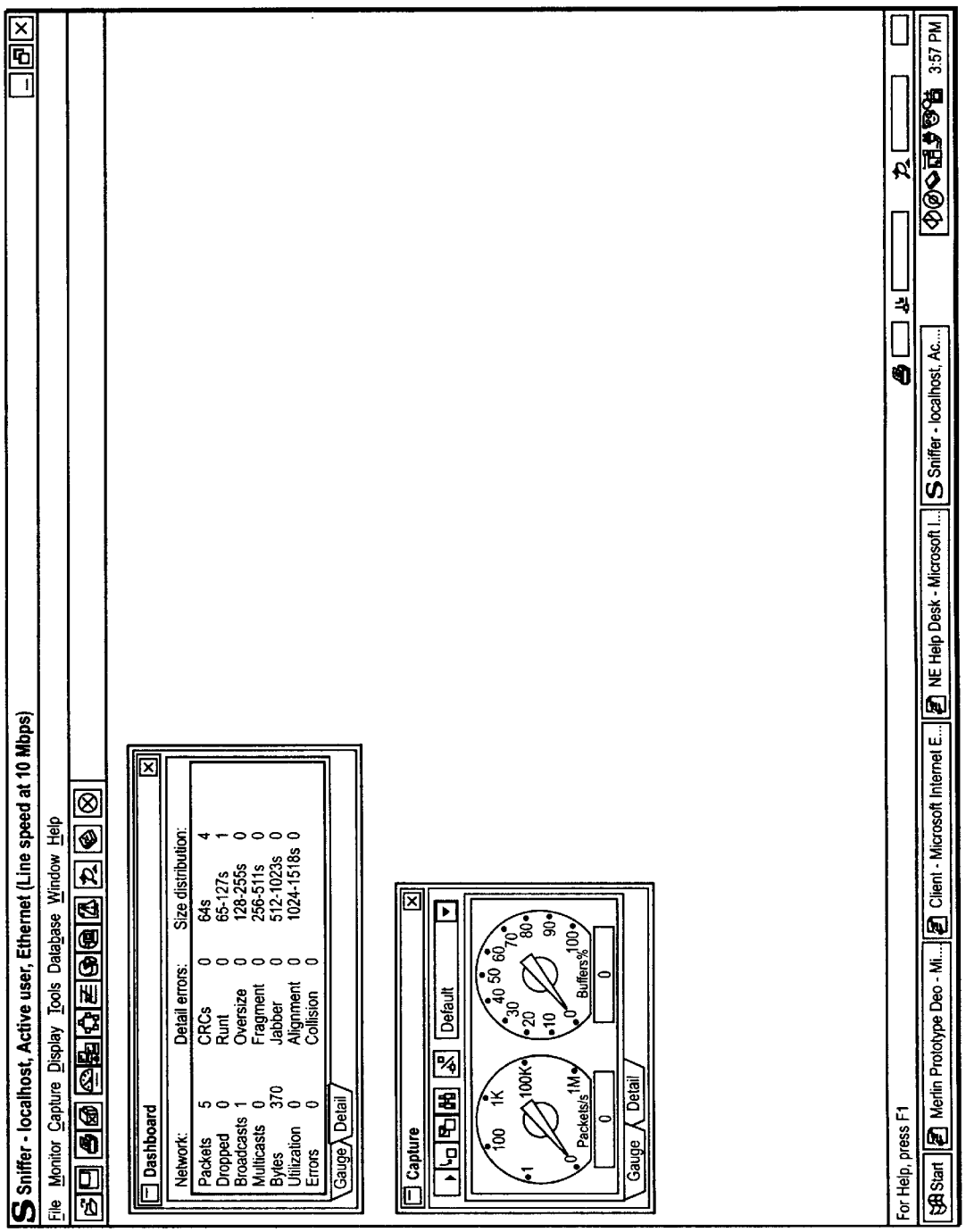
Figure 10:
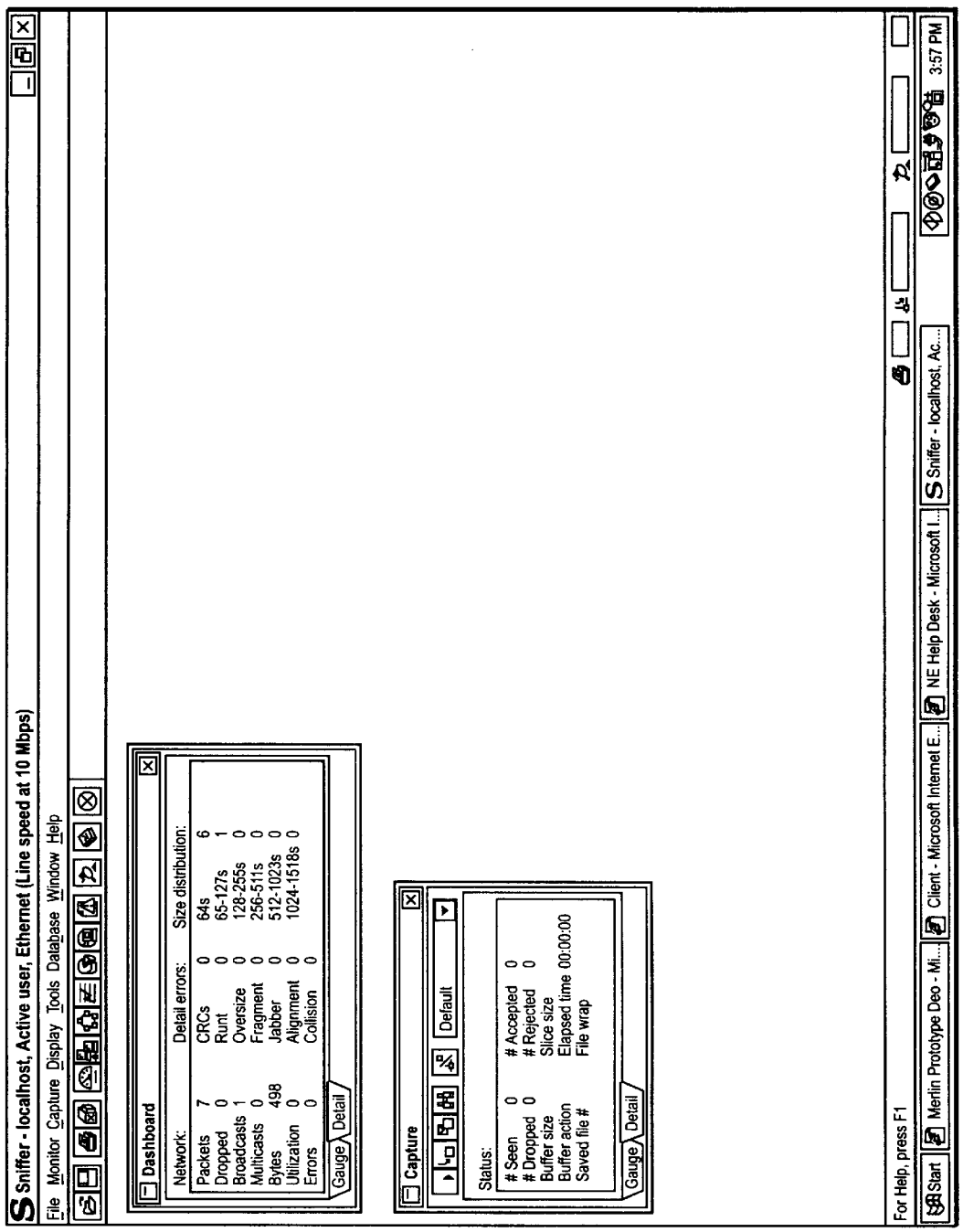
Figure 11:
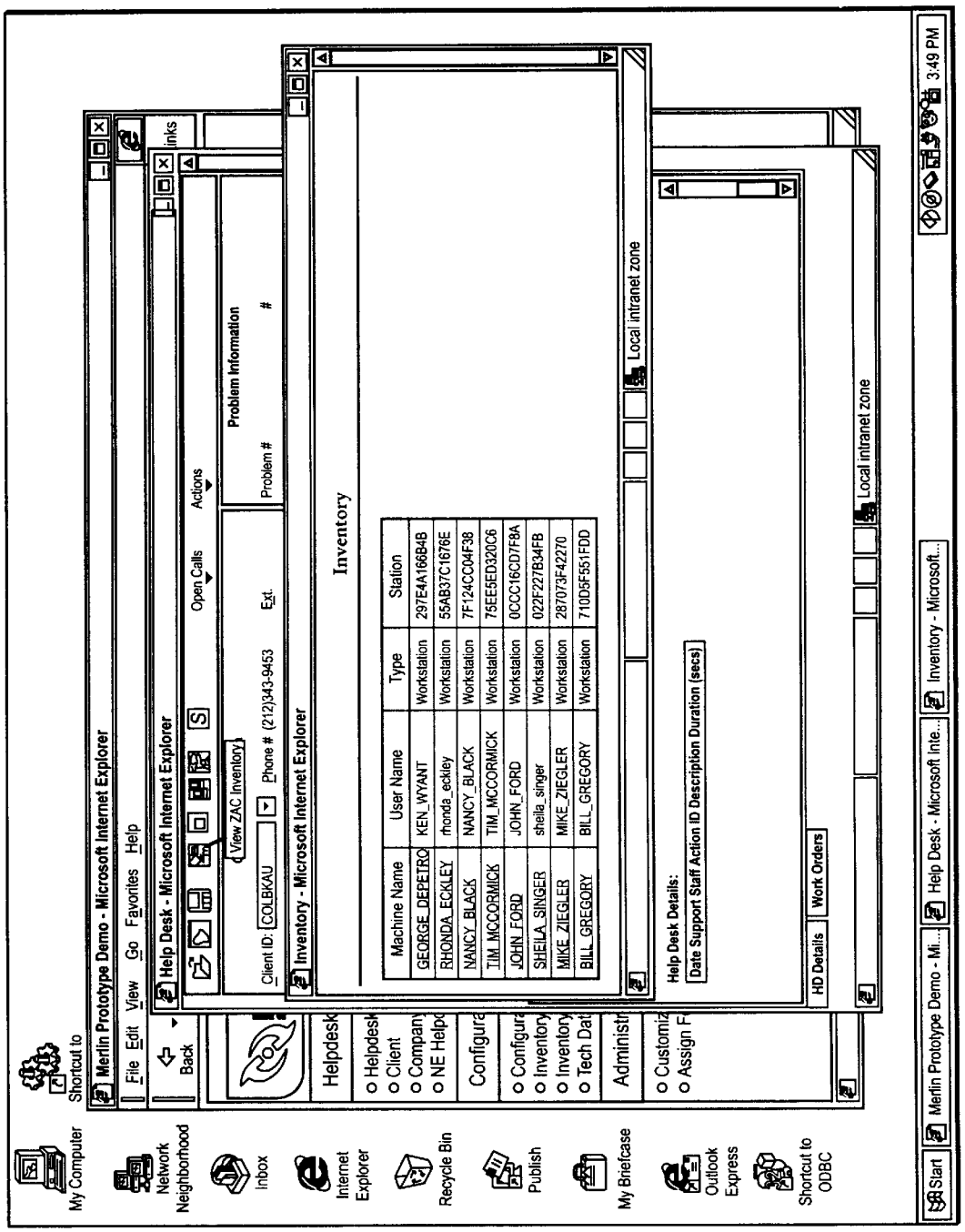
Figure 12:
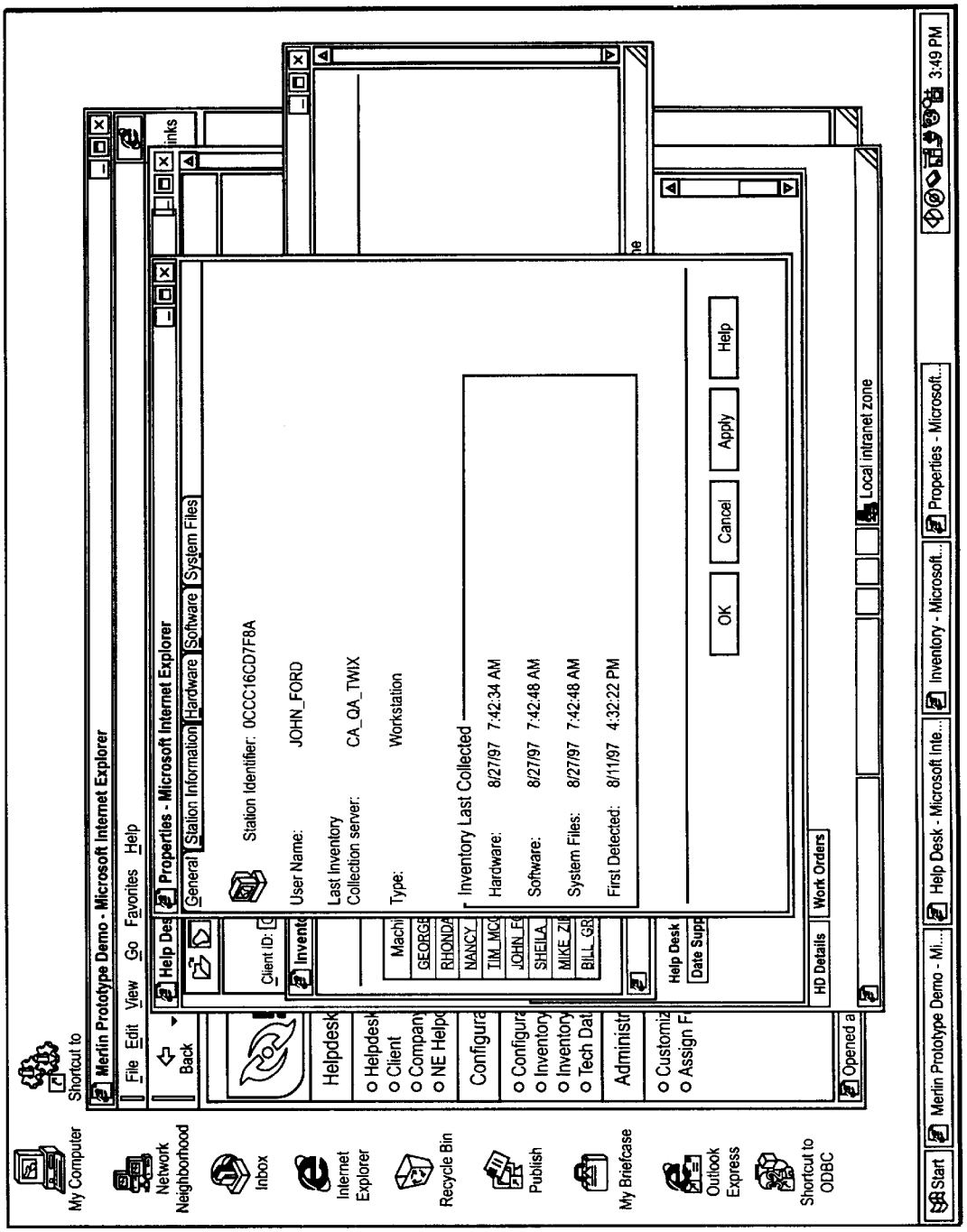
Figure 13:
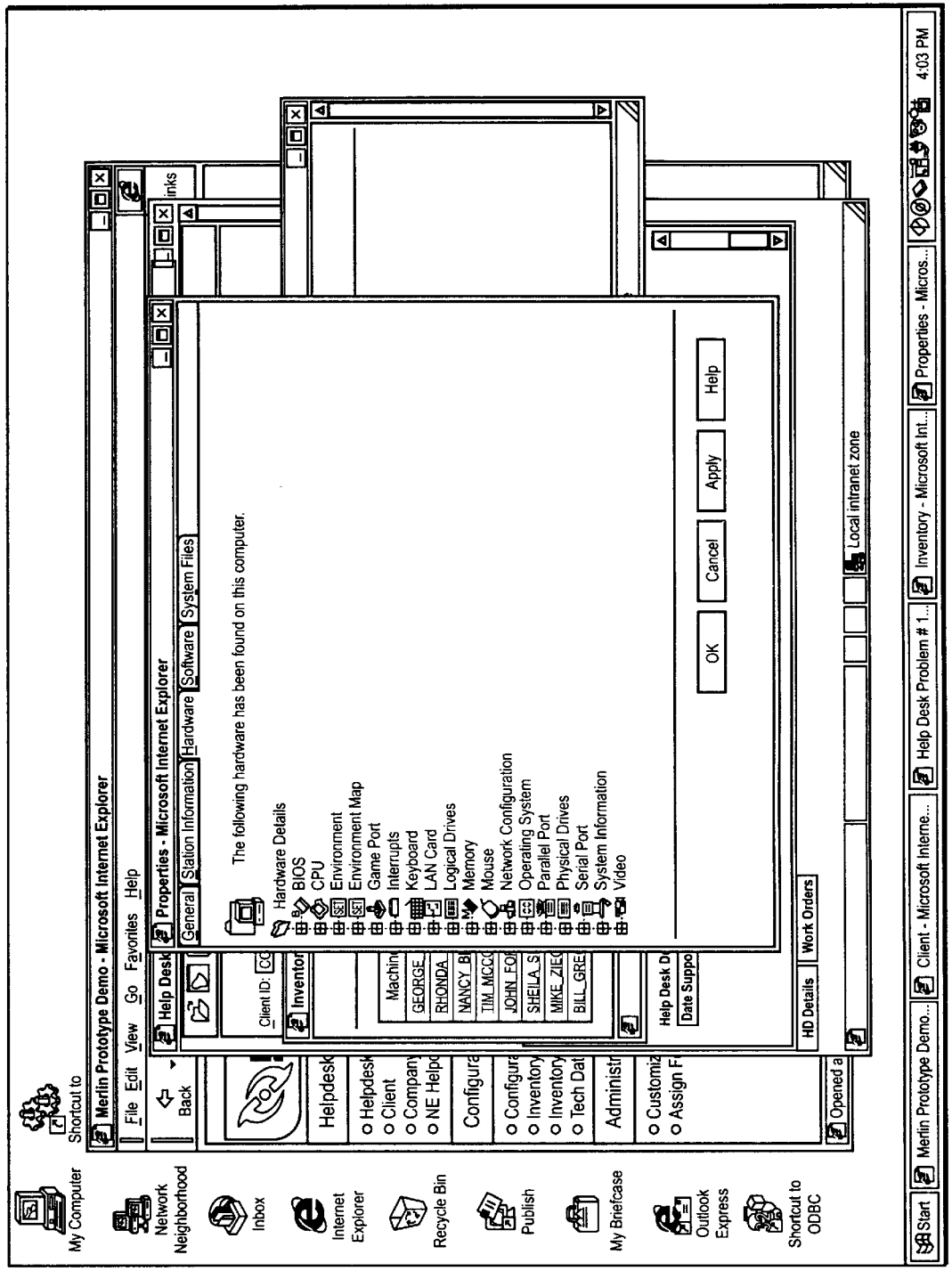
Figure 14:
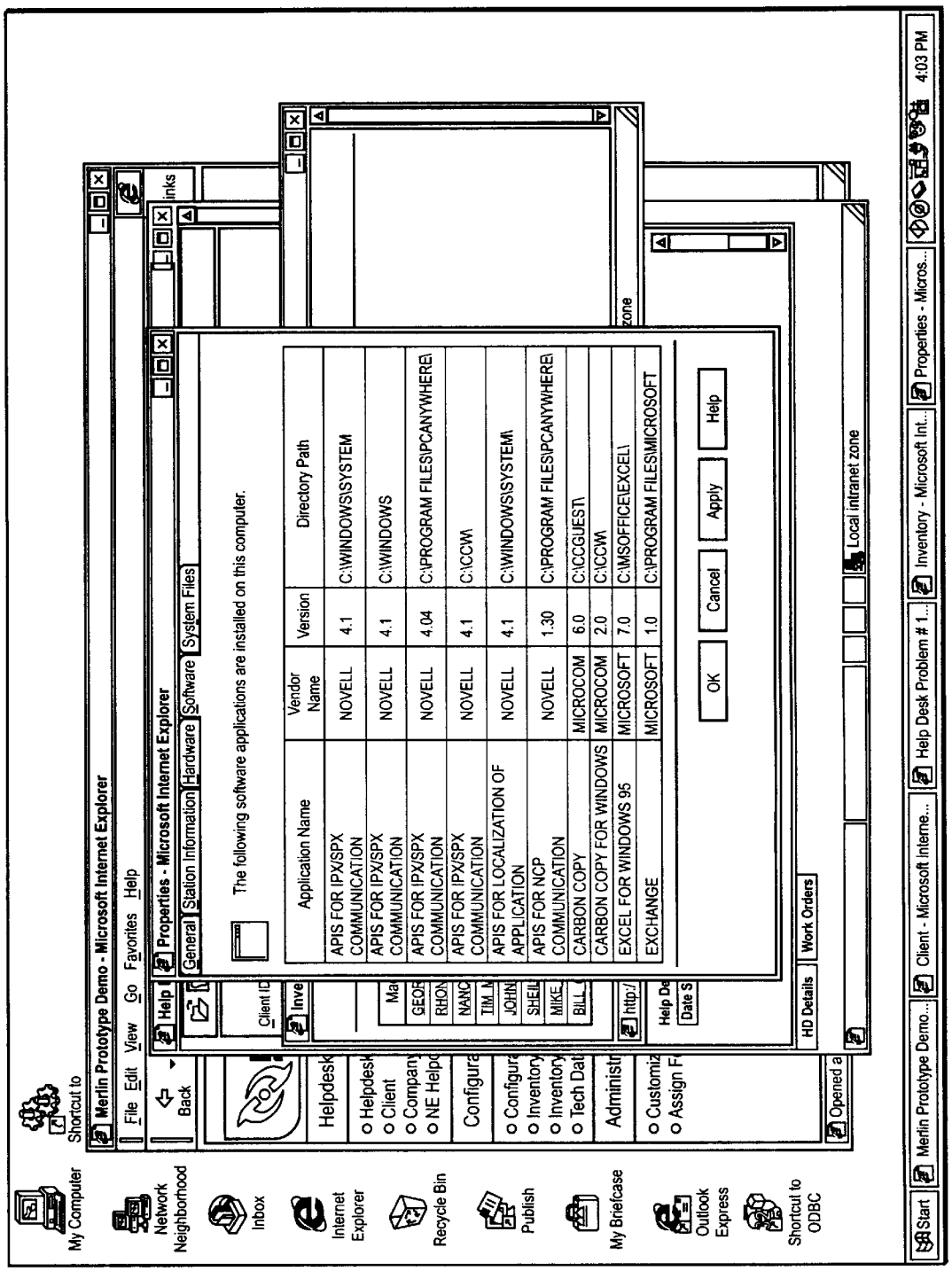
Figure 15:
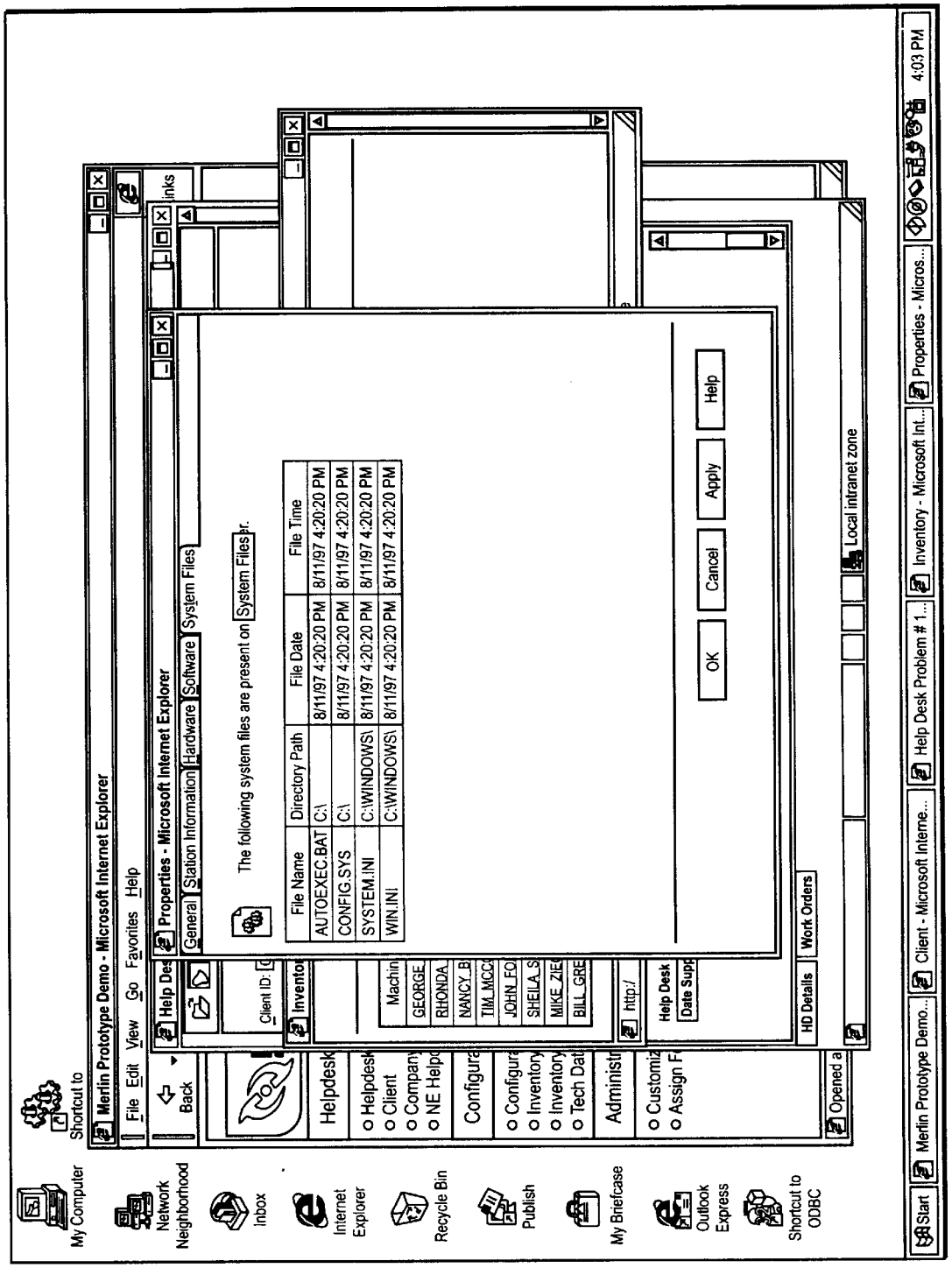
Figure 16:
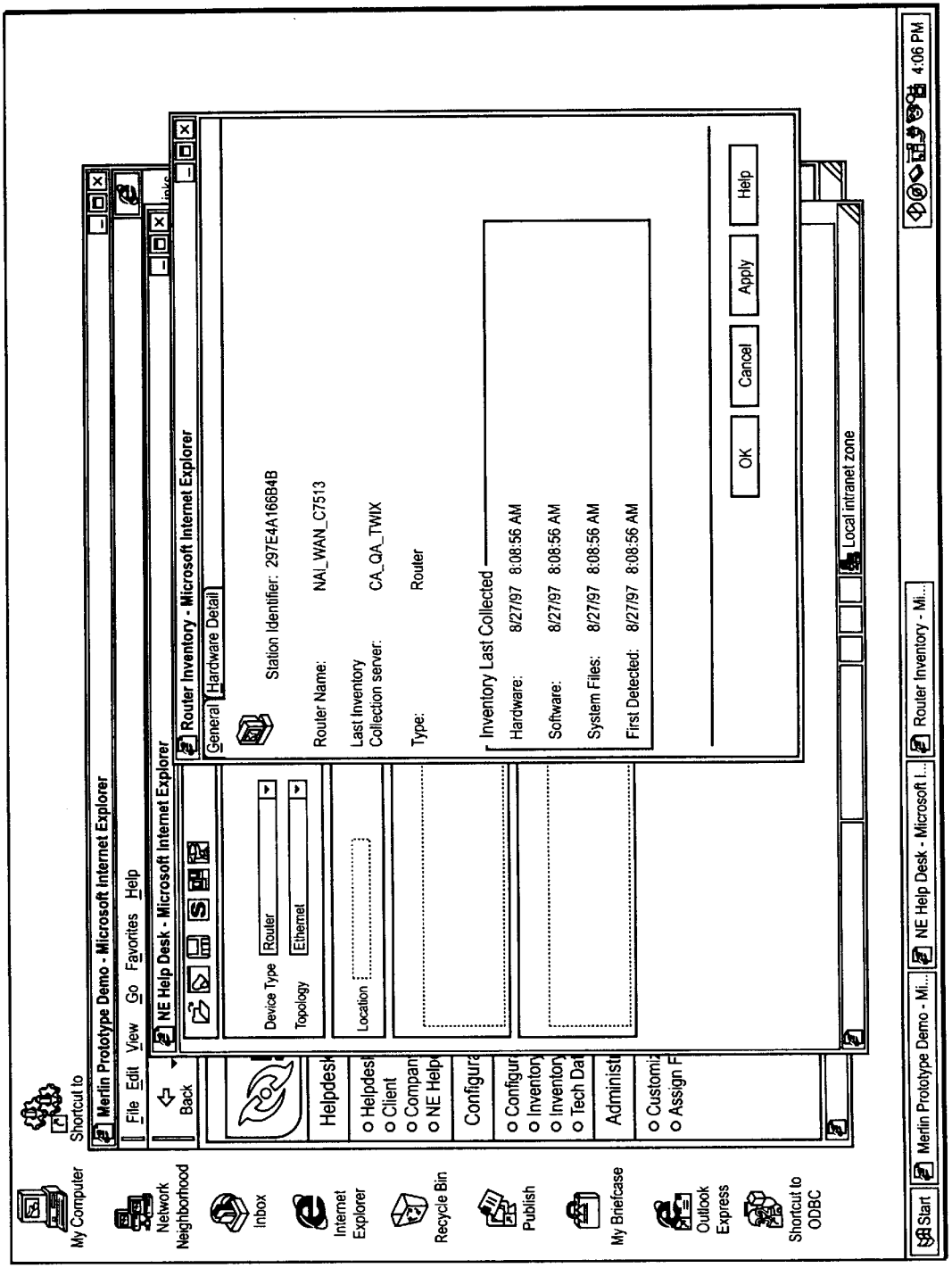
Figure 17:
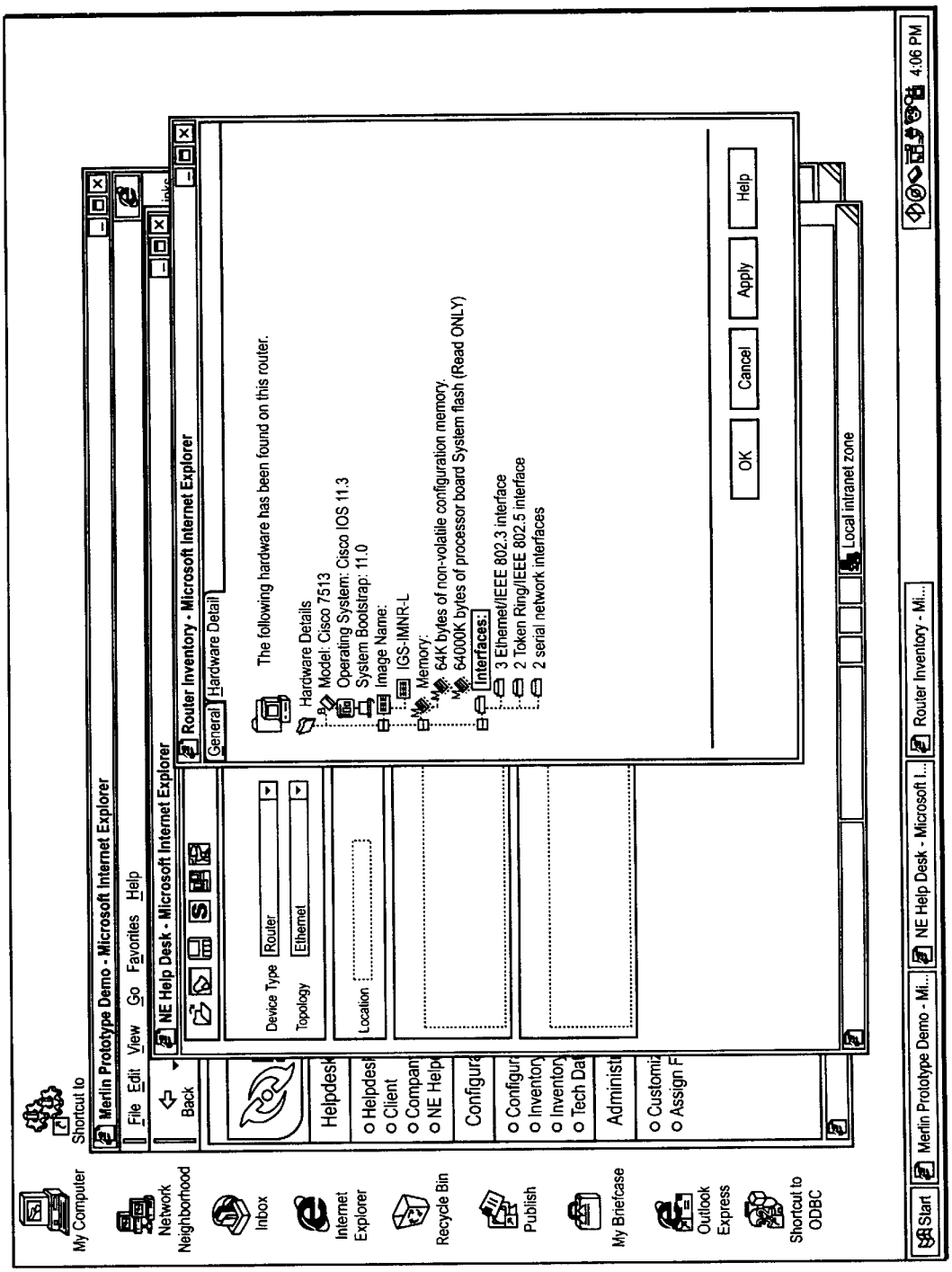

FIG. 3 shows steps for using a integrated browser-based network management application in accordance with a preferred embodiment. The steps of FIG. 3 are with reference to FIGS. 5–22 which represent browser-based help desk windows at various stages in accordance with a preferred embodiments. At step 302, the service person instantiates a web browser such as Internet Explorer 4.0, and directs it to a URL (Universal Resource Locator) of the help desk server 136. FIG. 5 shows a corresponding browser window 500 presented the service person at this stage. Upon entering an appropriate user ID and password, the user is presented with the top level browser-based help desk interface screen 600 shown in FIG. 6. Upon selecting the Help Desk option, an additional browser-based help desk screen 702 appears, as shown in FIG. 7. Multiple screens are easily manipulated using the browser features of Internet Explorer 4.0 or better. Browser-based help desk screen 702 comprises a plurality of trouble information fields 704, the specific contents of which are beyond the scope of the present disclosure but which may be found with respect to the help desk tools described supra such as McAfee HelpDesk™.

Browser-based help desk window 702 further comprises an application toolbar 706 upon which are several application launch buttons, including a network visibility launch button ("Distributed Sniffer Pro") 708, an administration software application launch button ("ZAC Inventory") 712, a knowledge base launch button (ServiceWare Knowledge Base) 712, a remote control launch button 714, and an internal help desk knowledge base launch button 716. Generally speaking, pressing of any of these buttons invokes the respective application from the browser-based help desk window 702, preferably in the form of an additional browser-based window.

At step 304, the trouble-ticket information is entered in the trouble information fields 704 as necessary. In accordance with a preferred embodiment, the browser-based help desk window helps to automate the process of entering caller information, e.g. when the service person enters a caller's name, for example, all other relevant fields are filled in automatically. Important information about the caller is also displayed automatically. If a caller has open trouble tickets, a pop-up window advising of this is shown at the outset. At step 306, the type of trouble is determined to the extent required to select which network management application is necessary at that time. In accordance with a preferred embodiment, if it is determined that network visibility information and/or testing is required, at step 308 the service person simply presses the network visibility launch button 708. This invokes the network visibility console application that may be interacted with as necessary at step 310 (see FIGS. 8–10) for attempted problem resolution. At step 312 it is determined whether such steps have solved the problem; if so the help desk ticket is closed at step 314, and if not the step 306 is repeated.

While it is preferable that the network visibility console application interface be browser-based, it is nevertheless within the scope of the preferred embodiments for this application to be resident on the computer from which it is being invoked. Such a configuration, while not being as convenient as if all applications launched from browser-based help desk interface 702 were themselves browser-based, still allows for the advantages of one-click access to the network visibility console application from within the customized browser-based help desk interface 702. Such a configuration further provides for a "helpdesk-centric" network management strategy, allowing for seamless access to the various network management applications, including network visibility applications, from a single customized browser window. Such a configuration still provides an advantage that when further applications become available, or when a network visibility application does eventually become browser-based, minimal launch interface changes are required.

If it is determined that the problem relates to administration software issues at step 306, then step 316 is taken for launching the administration software application link 710. At step 318, the administration software is used within a browser-based window and problem resolution is attempted. FIGS. 11–17 show browser-based administration session windows corresponding to step 318. At step 312 it is determined whether such steps have solved the problem; if so the help desk ticket is closed at step 314, and if not the step 306 is repeated.

Figure 18:
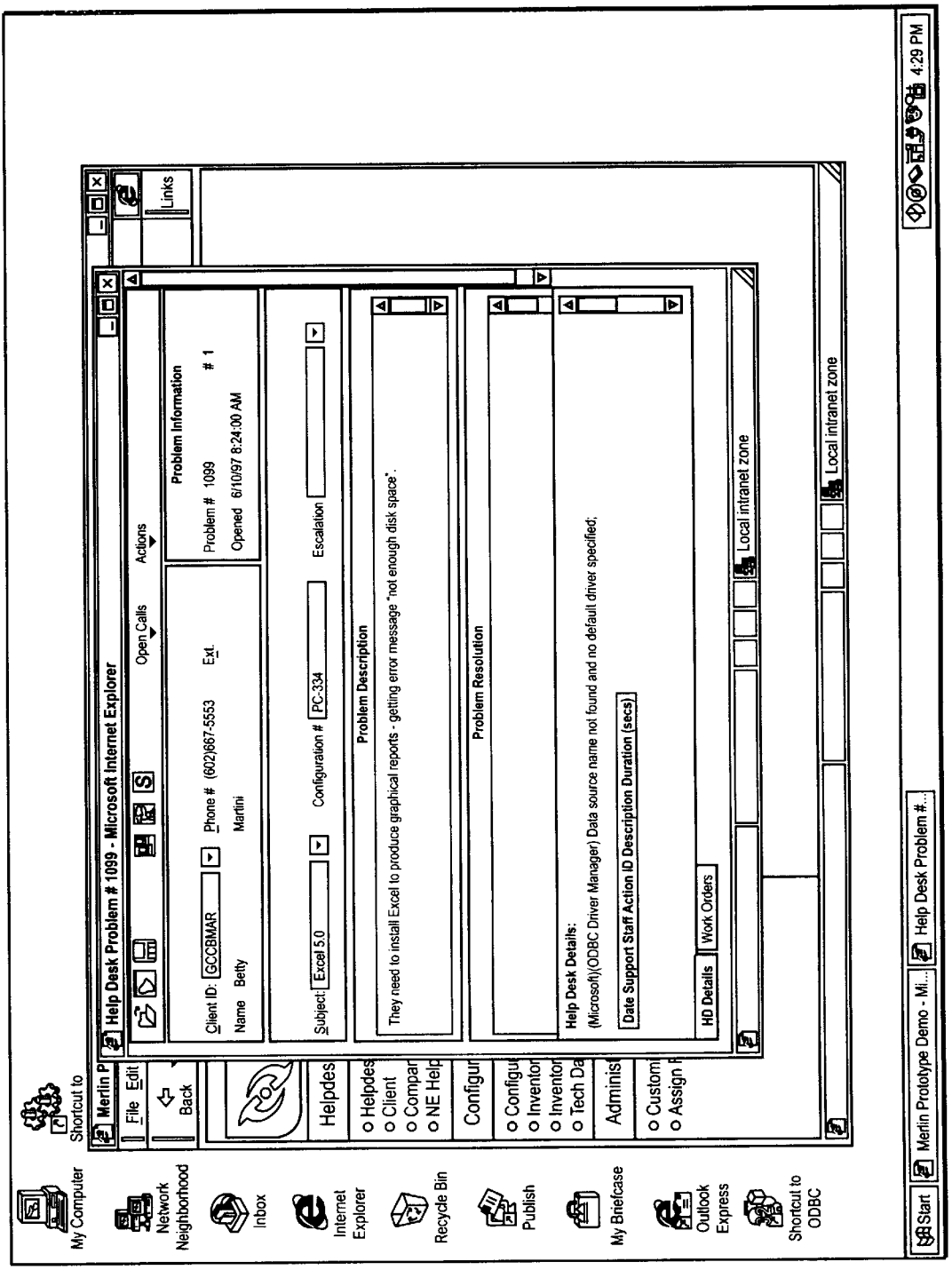
Figure 19:
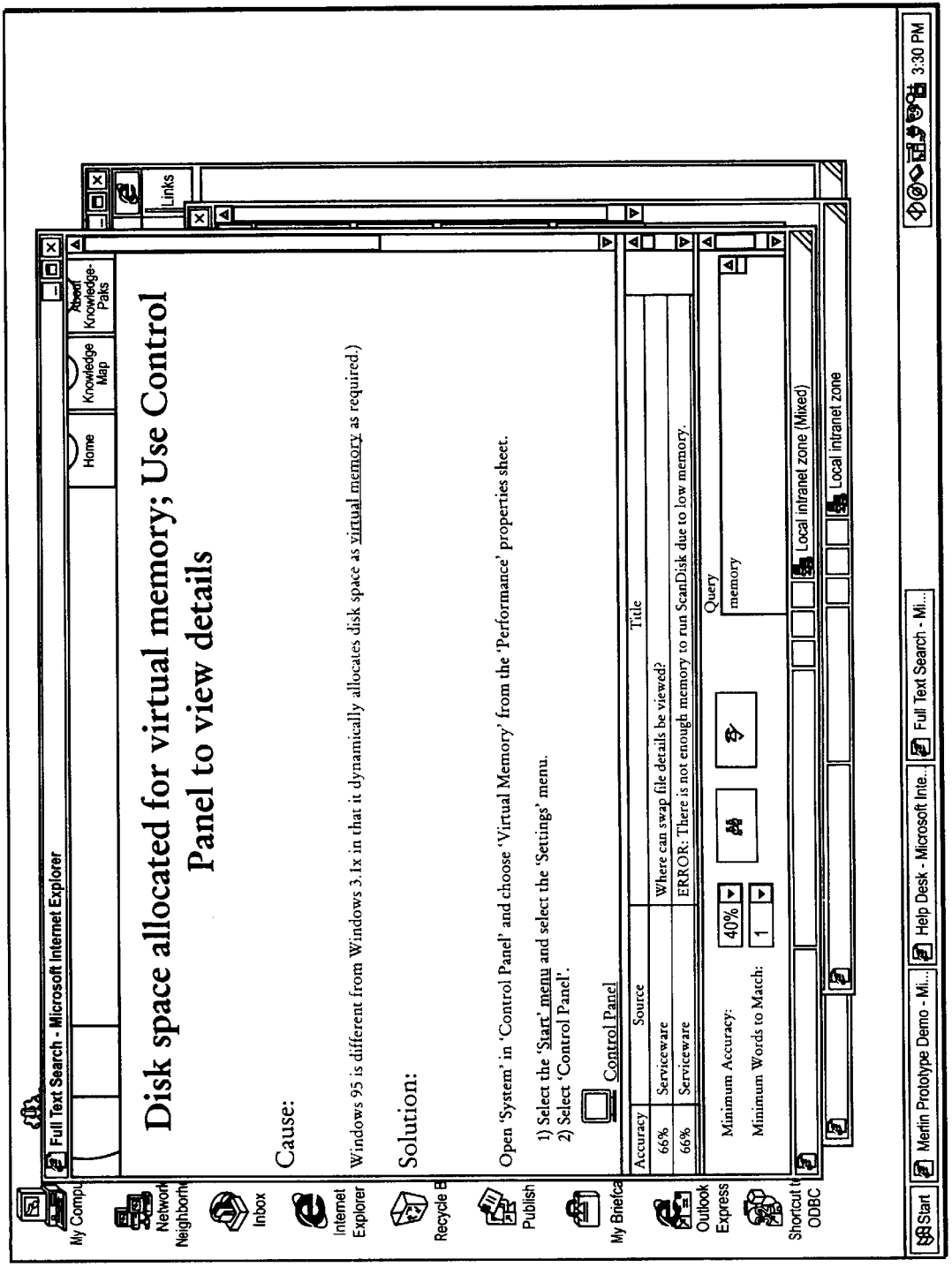
Figure 20:
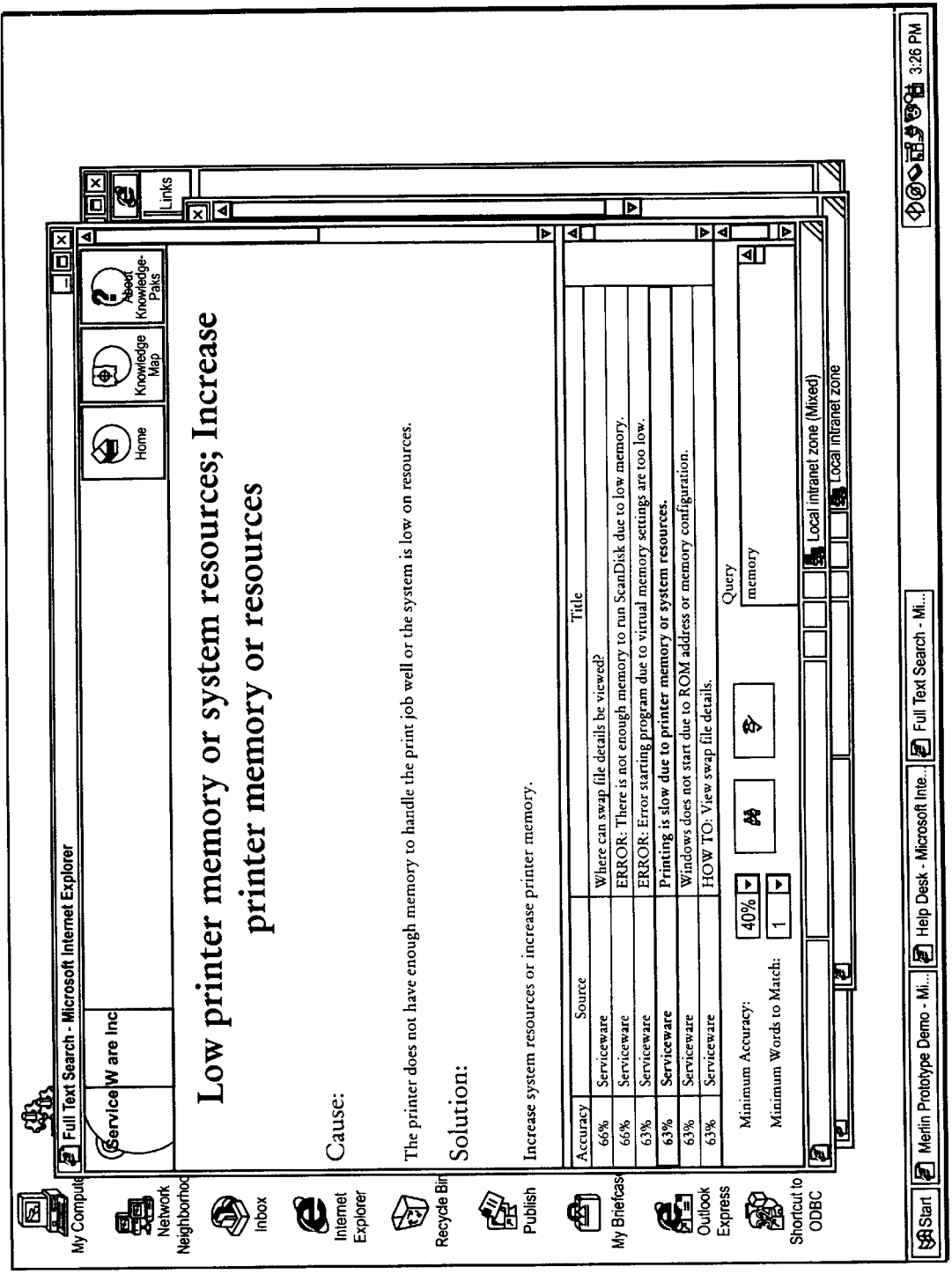
Figure 21:
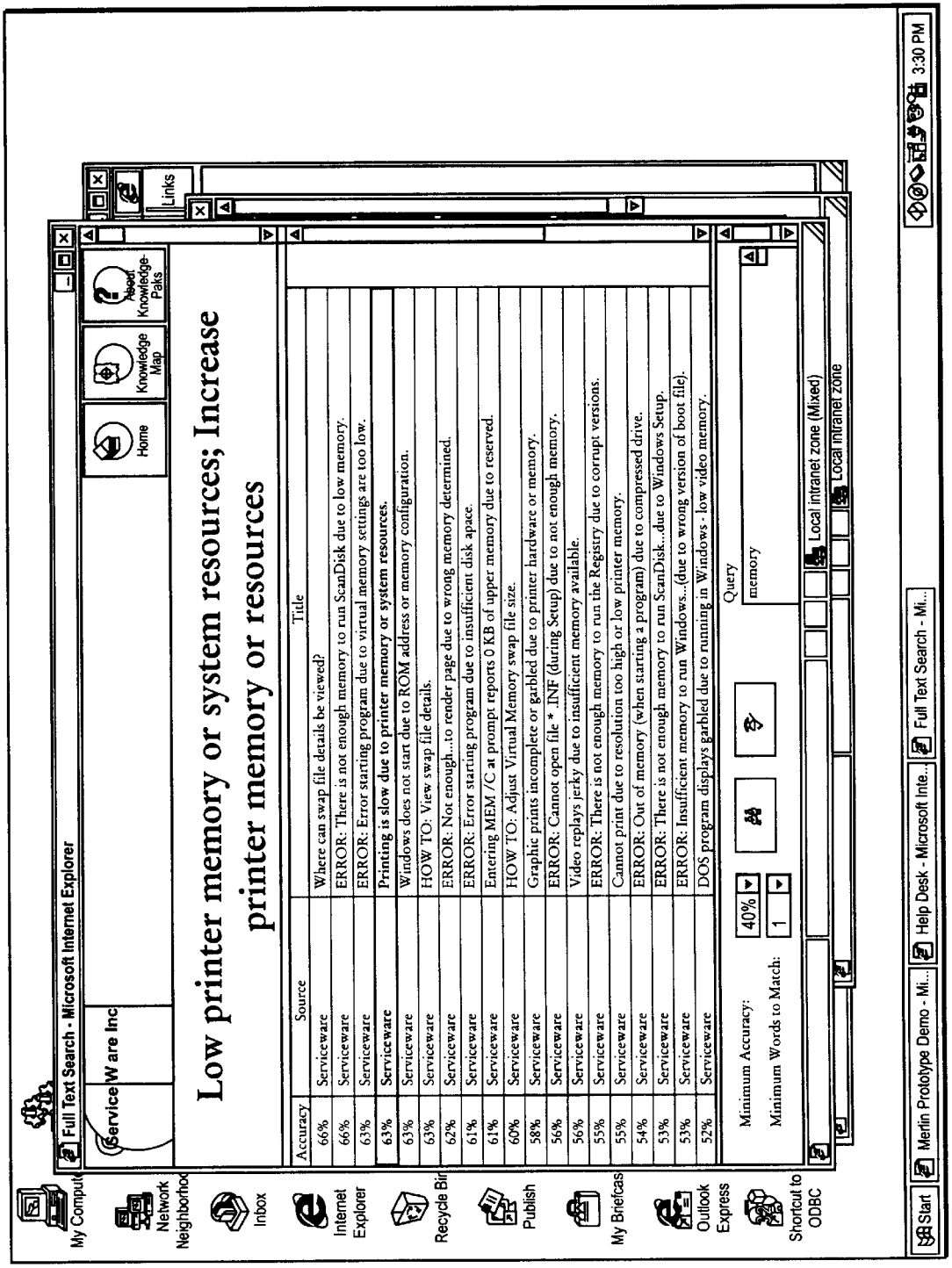
Figure 22:
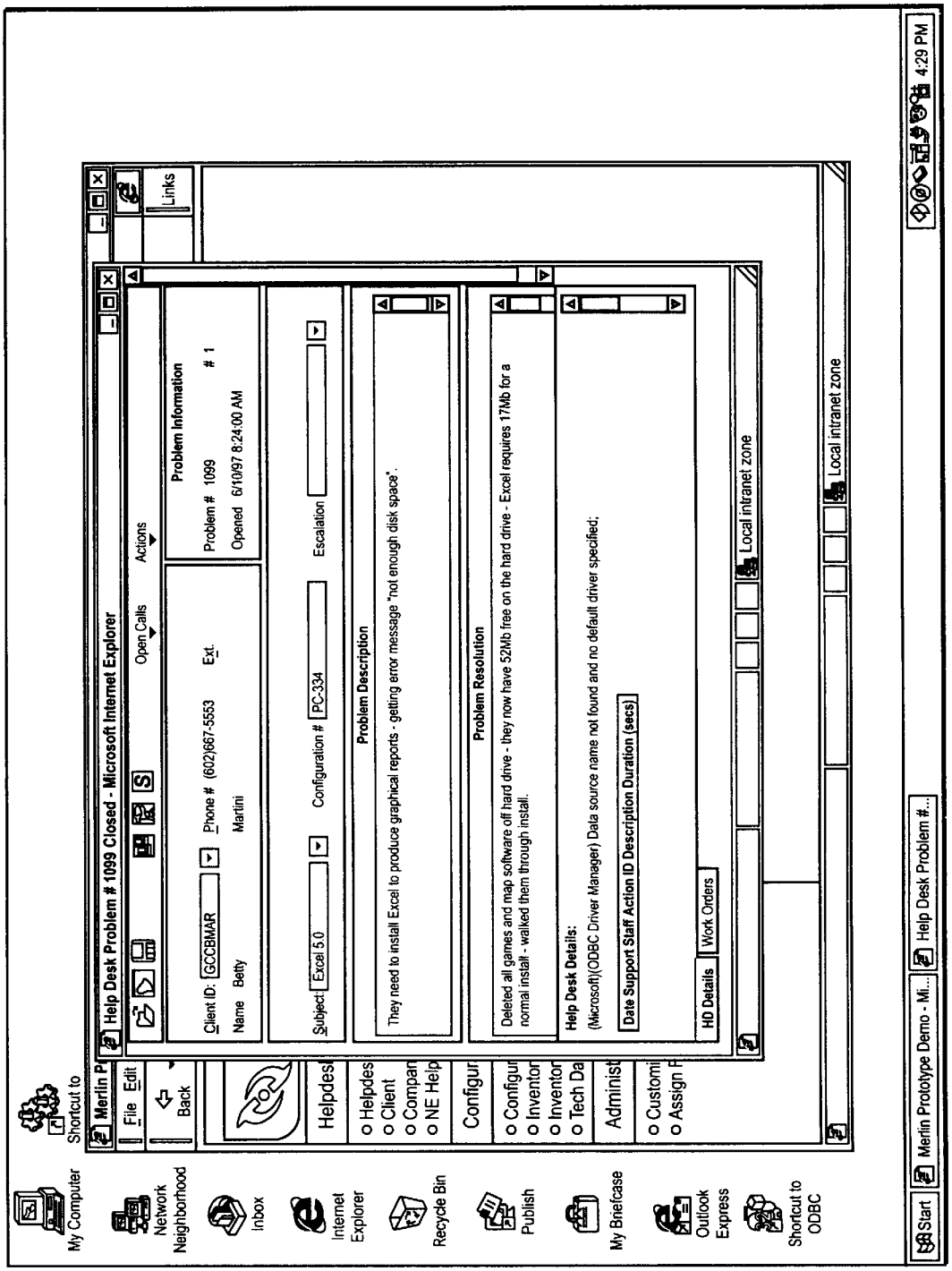

If it is determined that the problem requires the assistance of an expert system or knowledge base system at step 306, then step 320 is taken for launching a knowledge base application link by pressing either button 712 (Serviceware knowledge base) or 716 (internal helpdesk knowledge base). At step 322, the knowledge base software is used within a browser-based window and problem resolution is attempted. FIGS. 18–22 show trouble ticket windows and corresponding browser-based knowledge-based system windows corresponding to step 322. In particular, FIGS. 18 and 22 show an opened and closed help desk ticket, respectively, that may correspond to a scenario in which a knowledge based would be launched for assistance, and FIGS. 19–21 show browser-based knowledge-based system windows. At step 312 it is determined whether such steps have solved the problem; if so the help desk ticket is closed at step 314, and if not the step 306 is repeated.

Finally, if it is determined that the problem requires a remote control application, then step 324 is taken for launching a remote control application link by pressing remote control launch button 714. At step 326, the remote control software is used within a browser-based window and problem resolution is attempted. At step 312 it is determined whether such steps have solved the problem; if so the help desk ticket is closed at step 314, and if not the step 306 is repeated.

Figure 23:
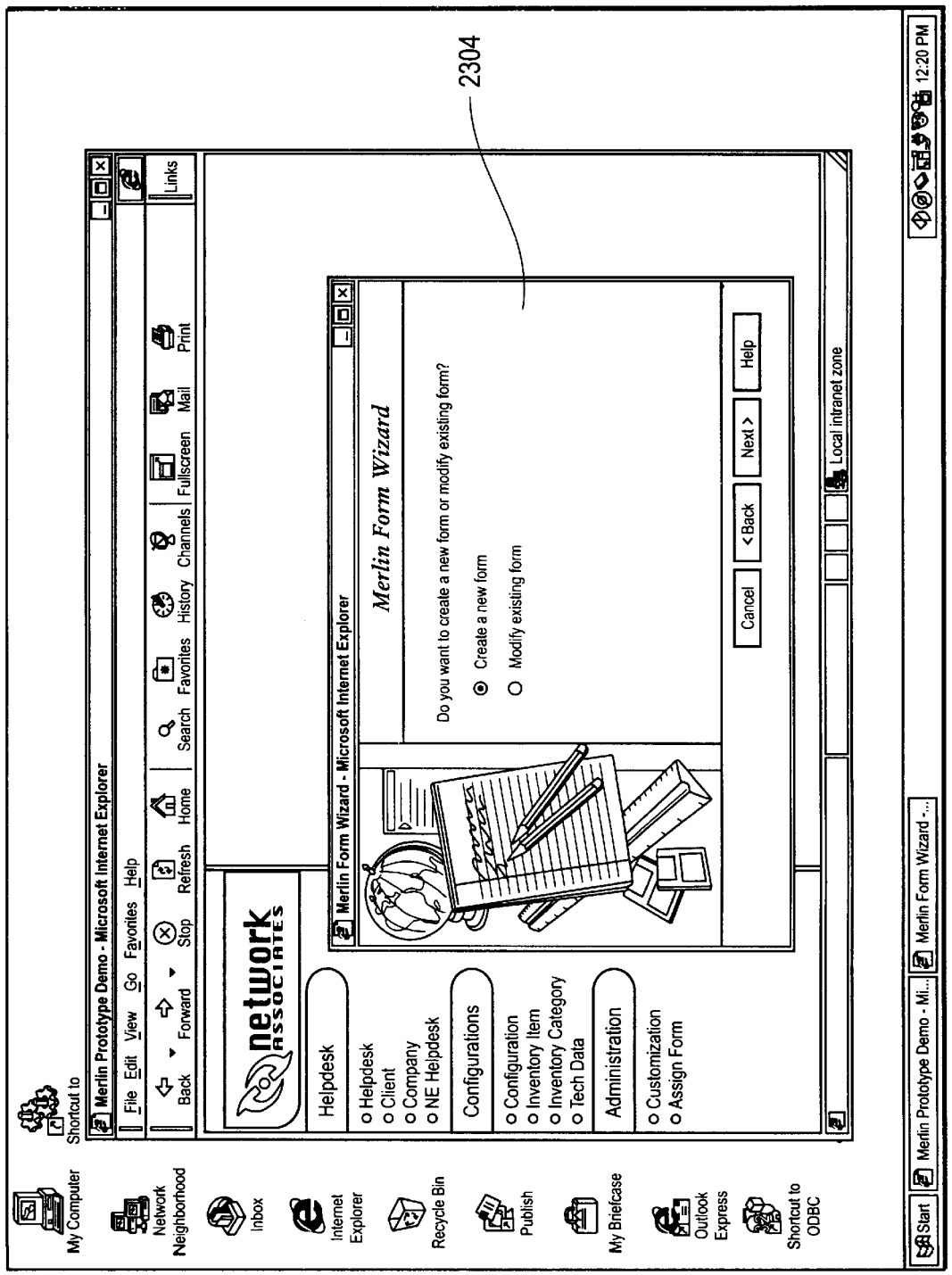
FIGS. 23–31 show windows corresponding to the step of FIG. 4.
Figure 24:
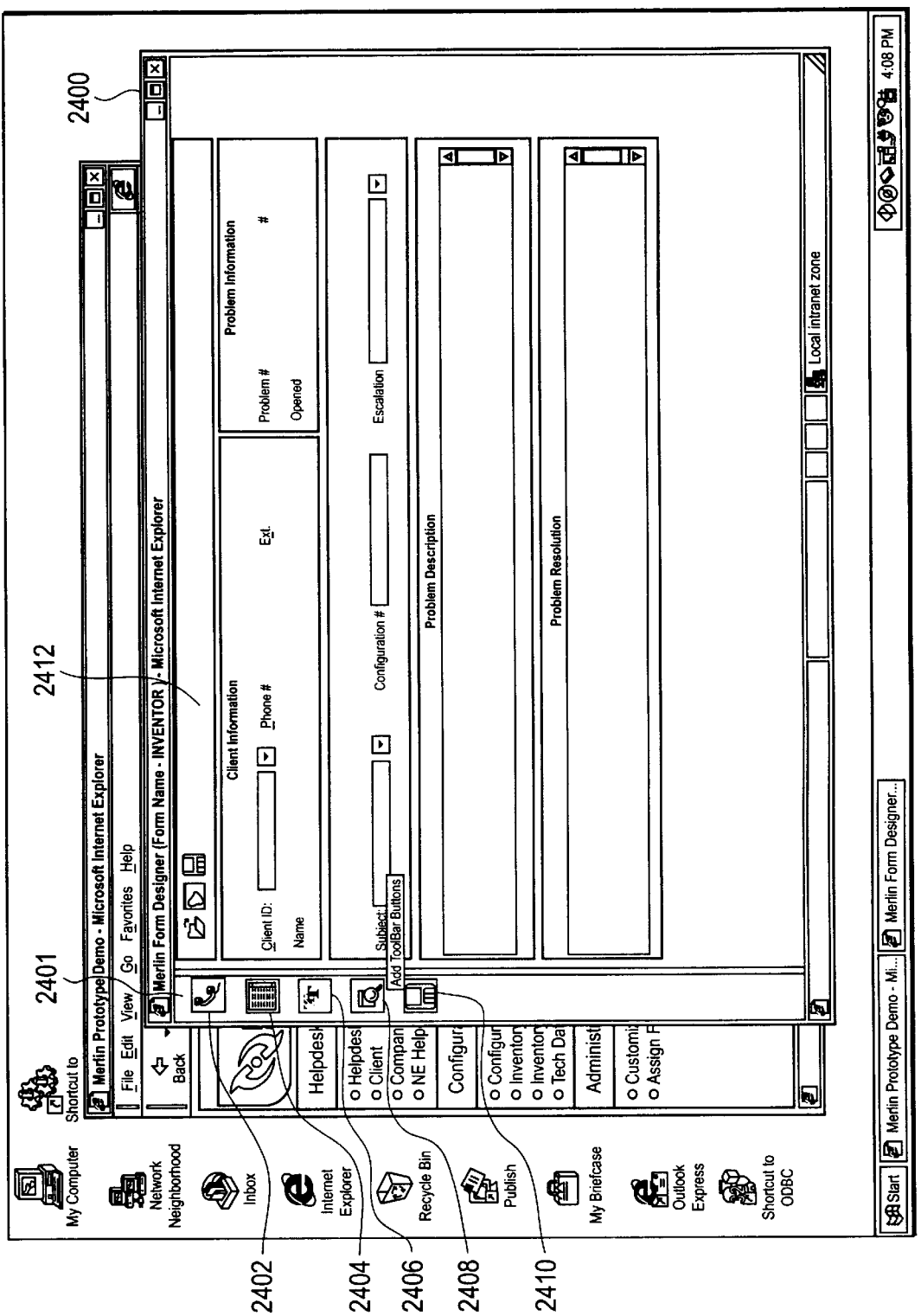

FIG. 4 shows steps for customizing a browser-based network management application interface by embedding a network visibility console application therein in accordance with a preferred embodiment. The steps of FIG. 4 are with reference to FIGS. 23–32 which represent browser-based help desk windows at various stages in accordance with a preferred embodiments. At step 402, the service person logs into the help desk server using a web browser in a manner similar to step 302 of FIG. 3. At step 404, the service person selects a Customization button 2302 as shown in FIG. 23, after which a Form Wizard dialog box 2304 appears, allowing the user to elect to create a new form or modify an existing form. In a subsequent window (not shown) the user may enter a name for the custom window if the new form option was chosen. A form designer window then appears, shown as element 2400 in FIG. 24. In the example of FIG. 24, the user has elected to create a new form and has called it "INVENTOR." Form designer window 2400 appears as a default help desk ticket form and comprises a graphical menu 2401 for allowing the user to select an Add Field button 2402 for adding a field to the help desk ticket form, an Add Separator button 2404 for adding a separator, an Add Text button 2406 for adding descriptive text to the form, an Add Toolbar button 2406 for adding an embedded application link to the toolbar of the help desk ticket form, and a Save button 2410 for saving the customized form. The toolbar of the default form is shown as element 2412 in FIG. 24.

Figure 25:
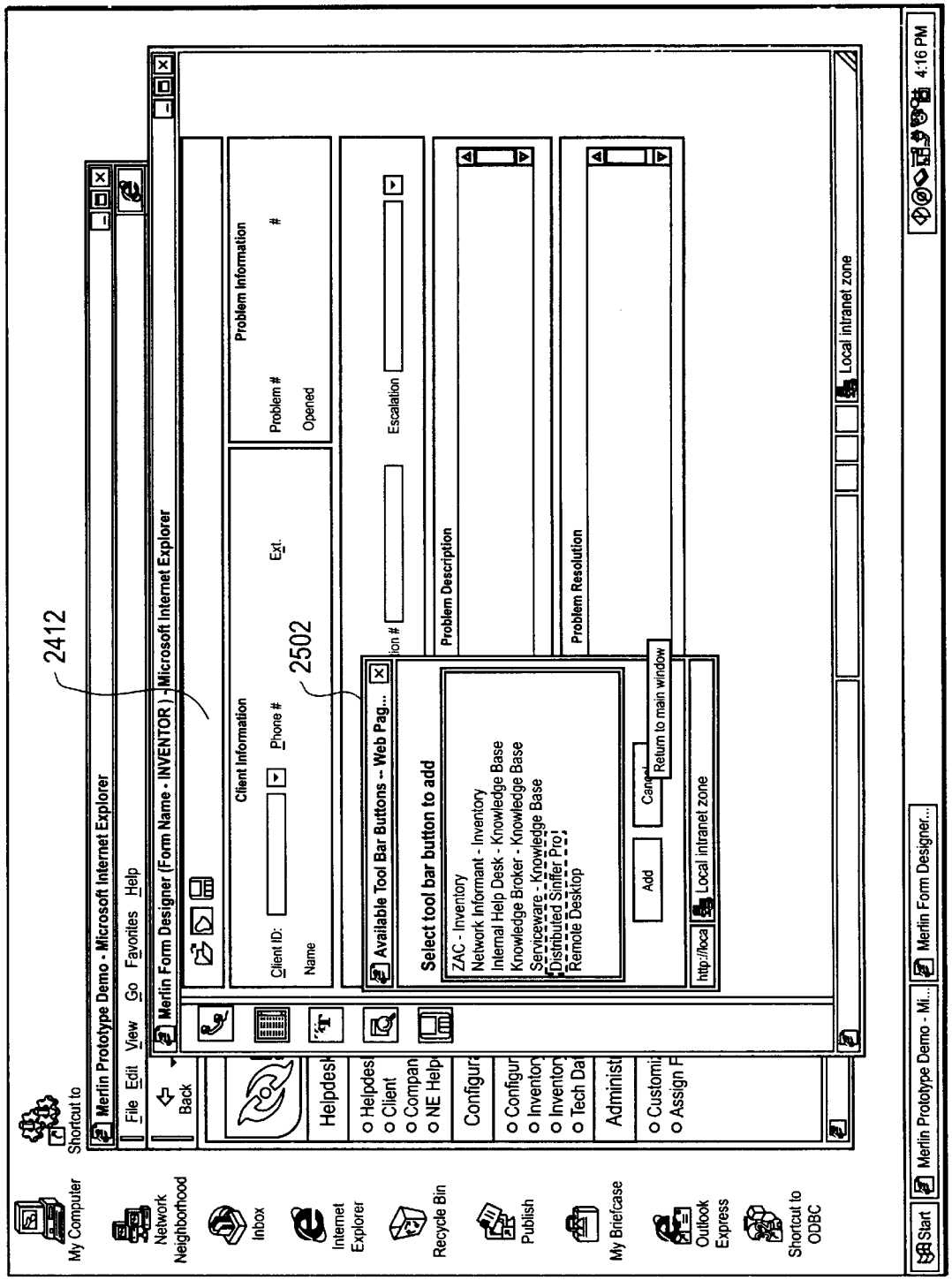
Figure 26:
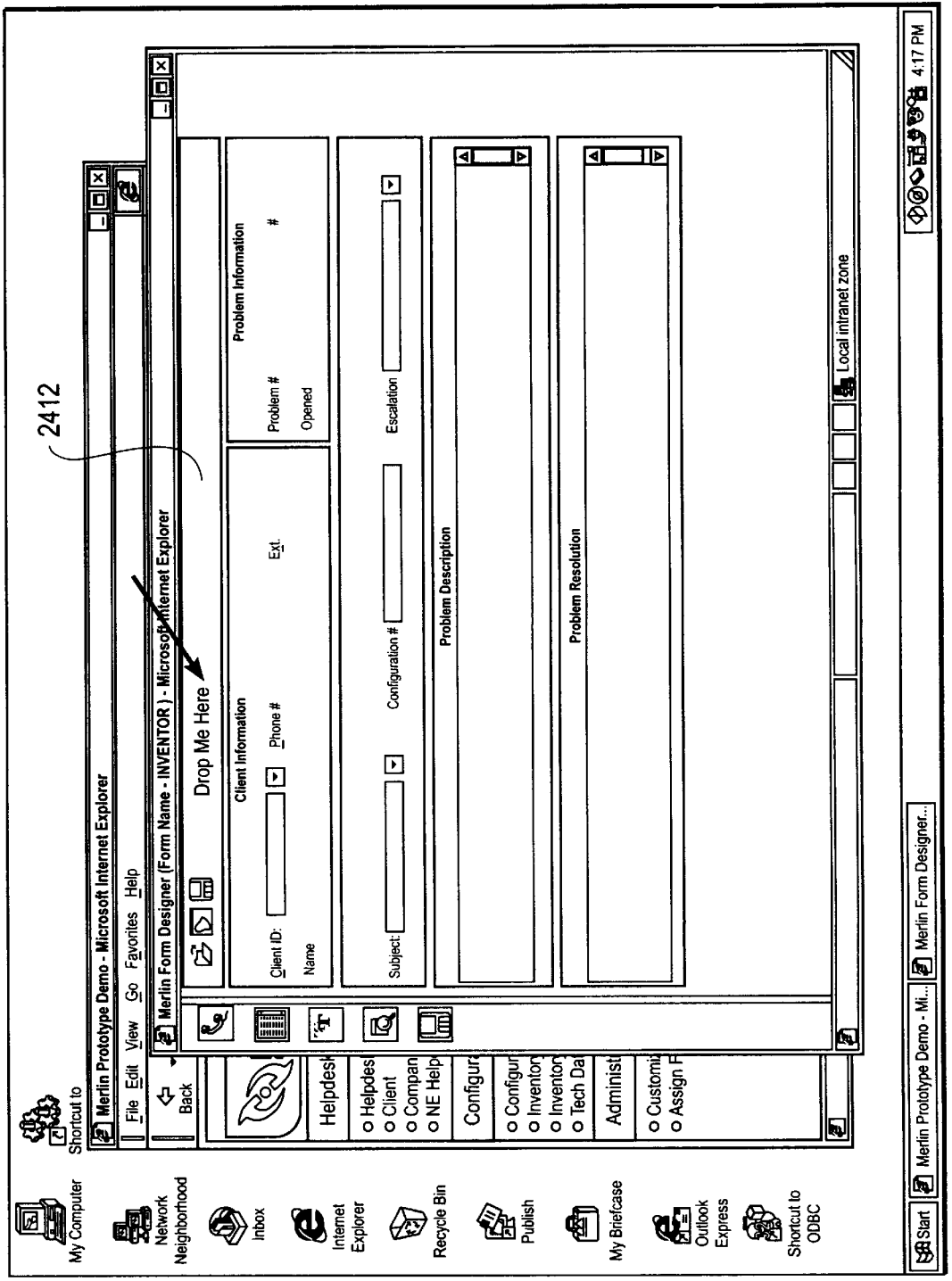
Figure 27:
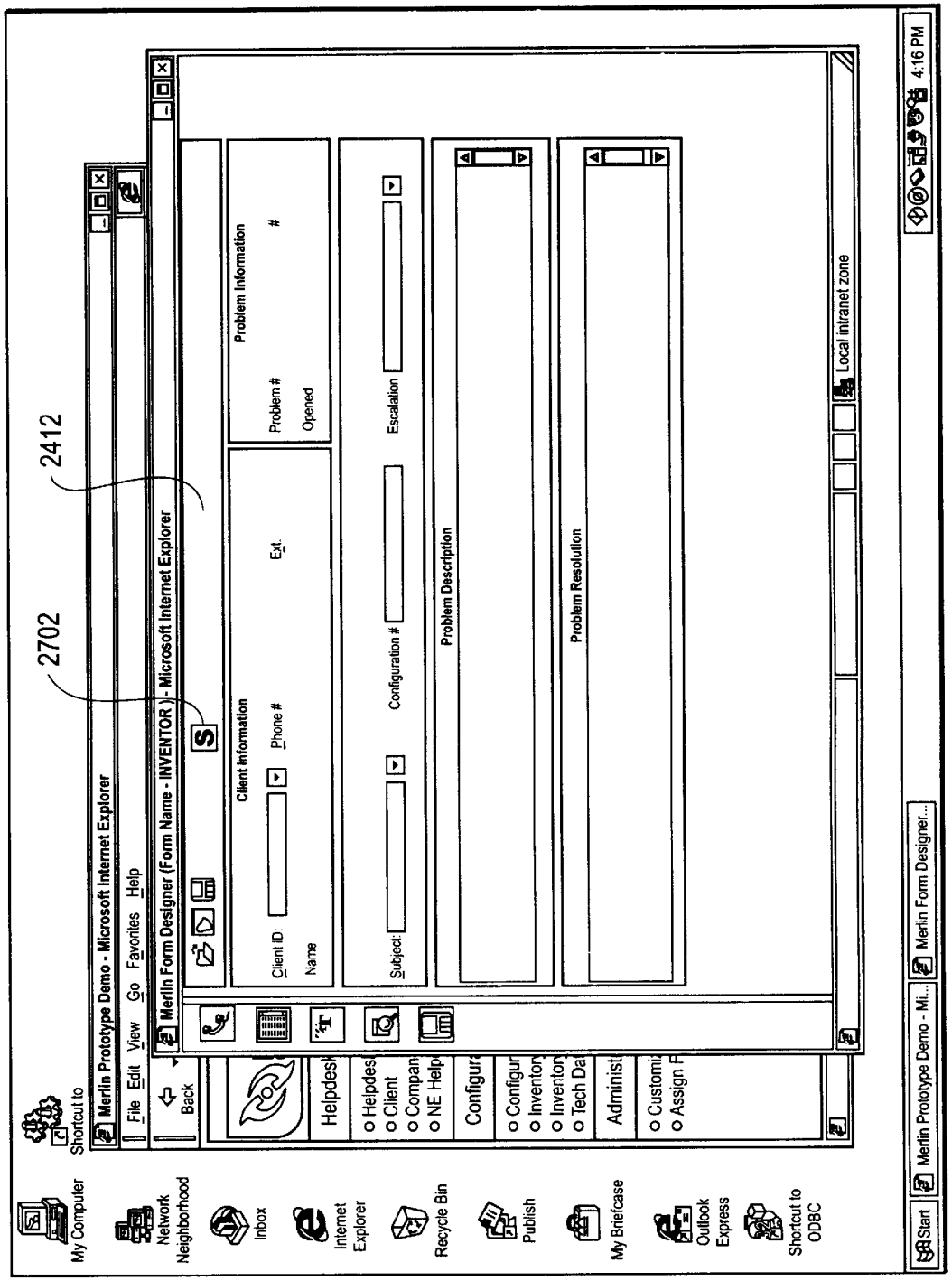
Figure 28:
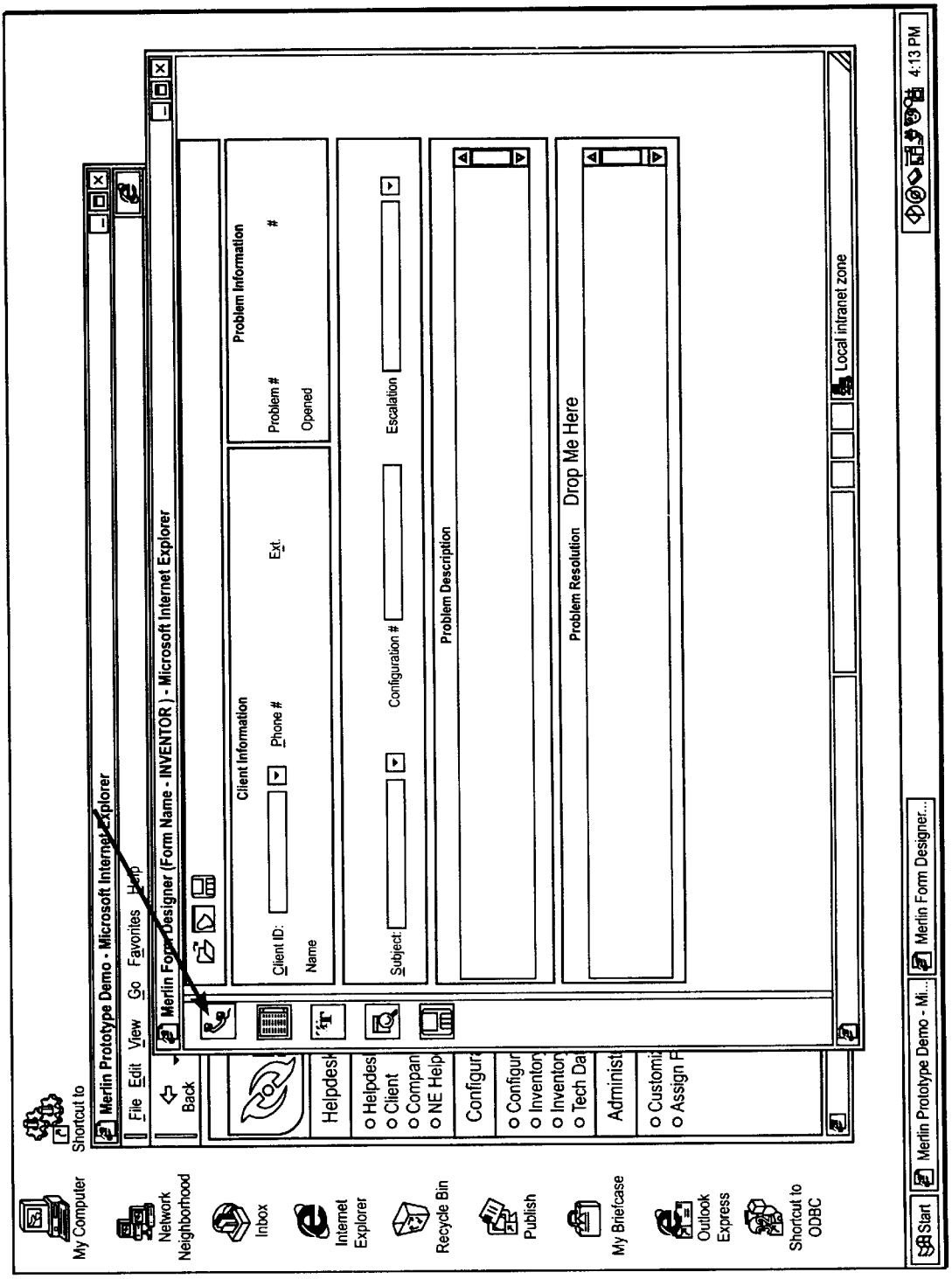
Figure 29:
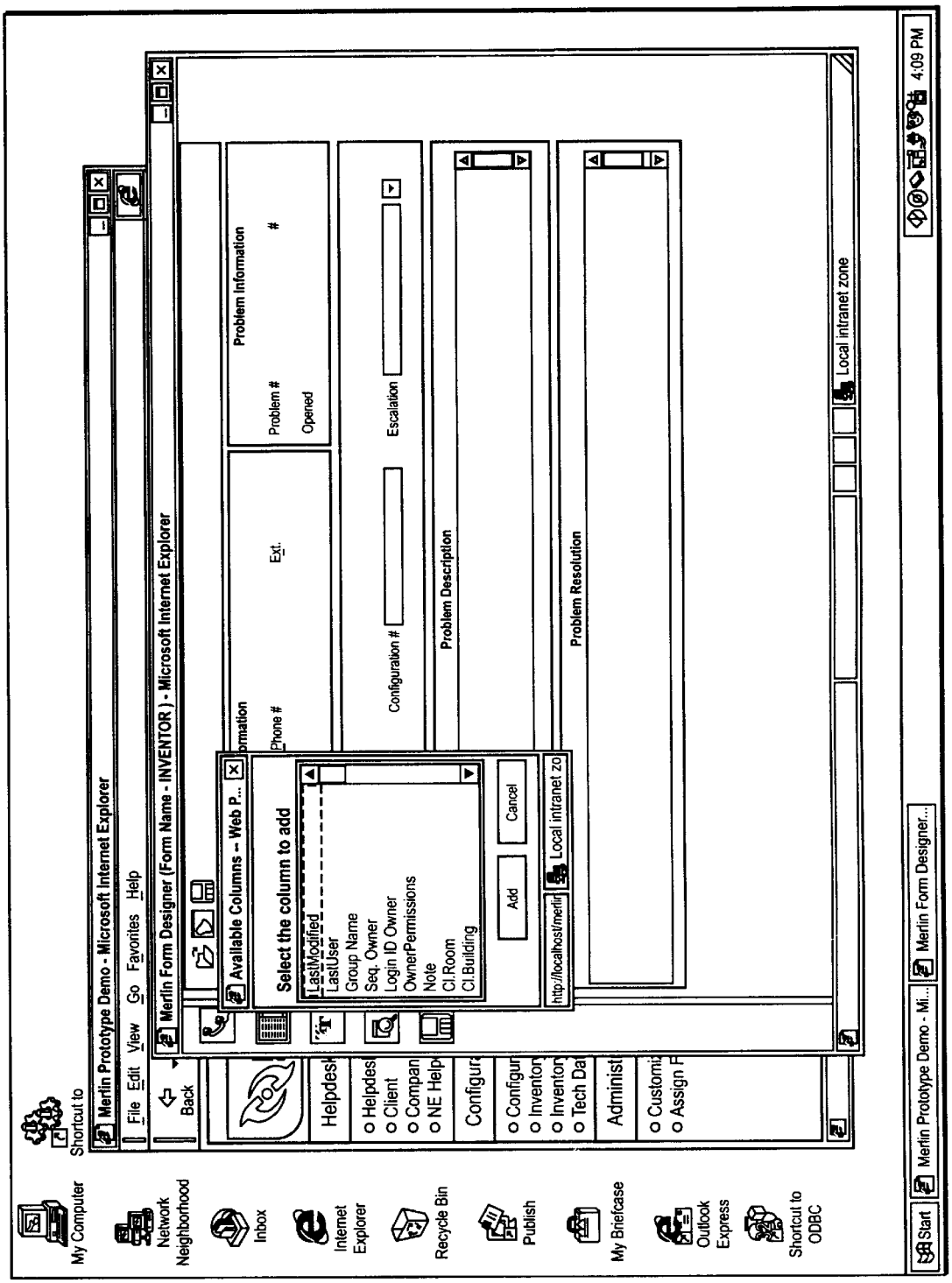
Figure 30:
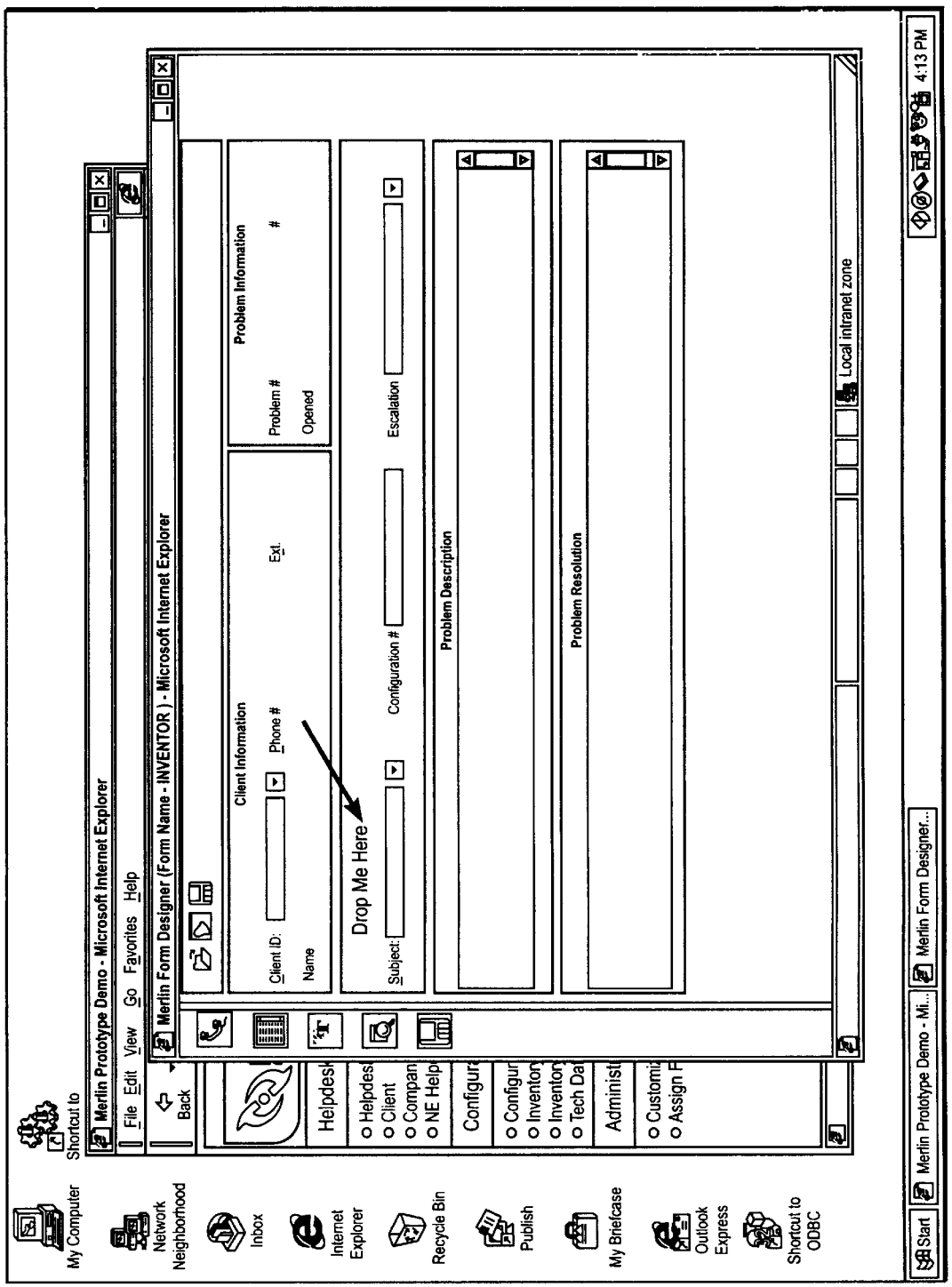
Figure 31:
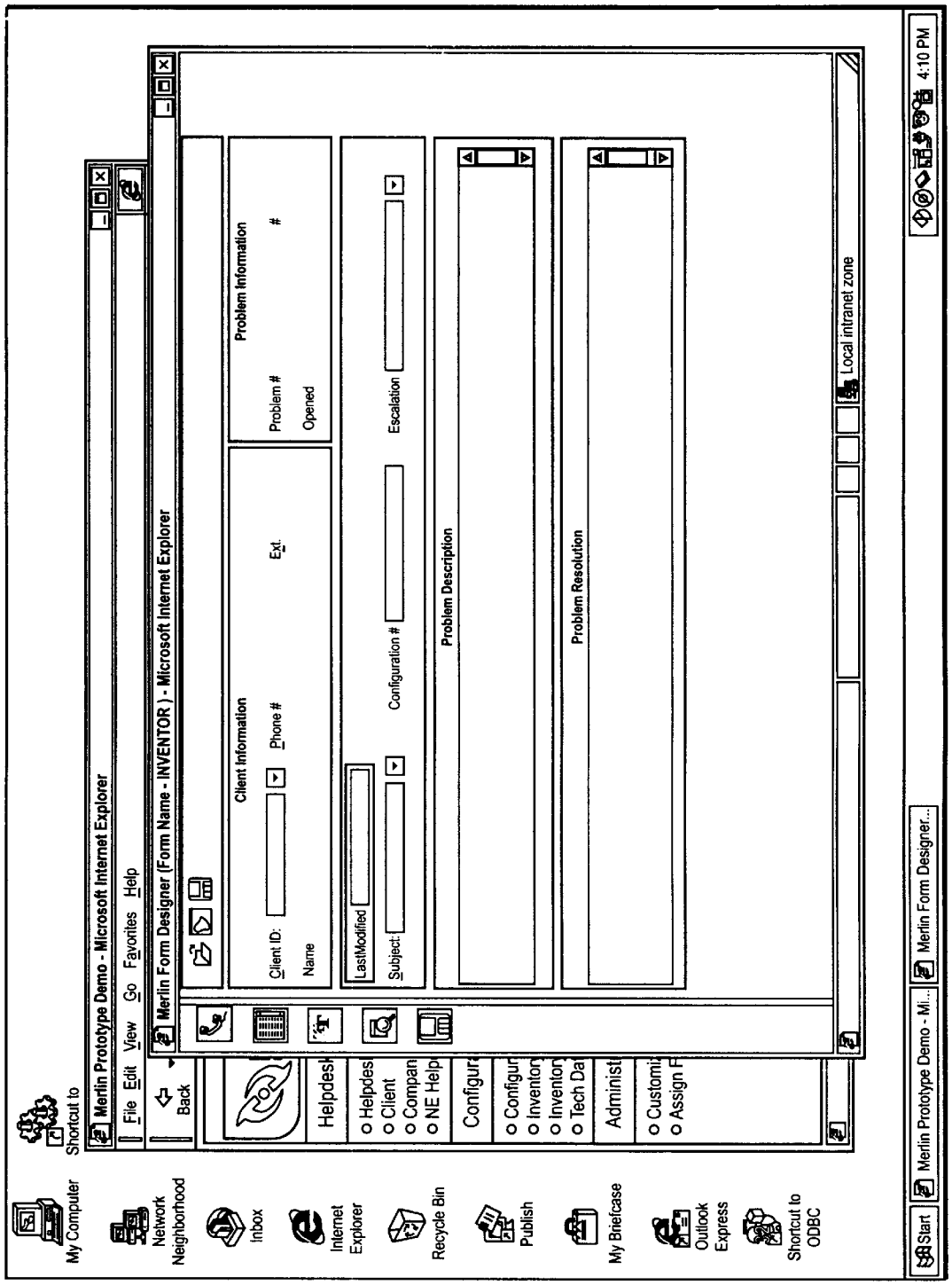

At step 406, the service person selects one of the customization task buttons on the graphical menu 2401, and as a particular example selects Add Toolbar button 2406. As shown in FIG. 25, an Add Toolbar Buttons dialog box 2502 appears, listing the applications available for embedded linking onto the toolbar 2401. At step 408, the service person selects the network visibility link ("Distributed Sniffer Pro") for adding to the toolbar 2412. At step 410, the service person drags a "Drop Me Here" pointer created responsive to step 408 over to the toolbar 2412 (see FIG. 26) and releases the mouse at the desired location of a new network visibility launch button, shown as element 2702 in FIG. 27, the "S" representing the "Sniffer" system. At step 412, the service person may save the new configuration by pressing the Save button 2410. At step 414, the user may return to step 406 for making further customizations of the help desk form, or may close the Form Designer browser window and log out at step 416. FIGS. 28–30 show steps similar to steps 406–410 except that the Add Field button 2402 is selected for adding further trouble information fields to the help desk form.

While preferred embodiments of the invention have been described, these descriptions are merely illustrative and are not intended to limit the present invention. For example, while the enterprise network described supra corresponds to a configuration where the system service personnel work for the same corporation as the end users, the scope of the preferred embodiments is not so limited. Indeed, the enterprise network in accordance with the preferred embodiments extends to configurations where the service personnel do not necessarily work for the same company as the end users, and may, for example, be specialized help desk service companies. In this situation, the enterprise network includes the networks of both the end user company and the help desk company, which are linked via the Internet, a dedicated WAN, or through other connection means. Those skilled in the art will recognize that the disclosed software and methods are readily adaptable for broader network management applications.

What is claimed is:

1. A computer program product for providing assistance to a service person in managing an enterprise network, the enterprise network comprising a plurality of user computers, a help desk server, and a network visibility server, said computer program product comprising:

computer code for providing a browser-based help desk window at any of the user computers, said browser-based help desk window providing an interface between the service person at the user computer and the help desk server;

computer code for allowing the service person to customize said browser-based help desk window by embedding a network visibility link therein; and computer code for launching a browser-based network visibility session between the service person and the network visibility server upon activation of said embedded network visibility link;

whereby the service person may use said browser-based help desk window at any of the plurality of user computers having a browser capability, and whereby the service person may also launch said network visibility session from the user computer for investigating network visibility problems therefrom.

2. The computer program product of claim 1, wherein said browser-based help desk window comprises:

a trouble information field for entering data related to client trouble calls; and a toolbar for displaying launch buttons;

wherein said network visibility link is embedded on said toolbar using drag and drop commands when said browser-based help desk window is customized.

3. The computer program product of claim 2, said enterprise network also having an administration software server, said computer program product further comprising:

computer code for allowing the service person to customize said browser-based help desk window by embedding an administration software link therein; and computer code for launching a browser-based administration software session between the service person and the administration software server upon activation of said embedded administration software link.

4. The computer program product of claim 3, said administration software server having a remote control application, said computer program product further comprising:

computer code for allowing the service person to customize said browser-based help desk window by embedding a remote control link therein; and computer code for launching a browser-based remote control session between the service person and a remote computer using said remote control application upon activation of said embedded remote control link.

5. The computer program product of claim 4, said help desk server having a knowledge base application, said computer program product further comprising:

computer code for allowing the service person to customize said browser-based help desk window by embedding a knowledge base link therein; and computer code for launching a browser-based knowledge base session between the service person and the help desk server application upon activation of said knowledge base link.

6. The computer program product of claim 1, further comprising computer code for administering a database of service personnel, said database comprising, for each service person contained therein, a service person identifier and a network visibility privileges indicator, wherein a service person may be prevented from customizing their browser-based help desk window to contain said network visibility link upon having a negative network visibility privileges indicator.

7. The computer program product of claim 1, wherein said help desk server is located on a same computer as said network visibility server.

8. The computer program product of claim 1, wherein said help desk server is located on a different computer than said network visibility server.

9. The computer program product of claim 2, wherein said administration software server, said help desk server, and said network visibility server are contained on separate computers.

10. A method for using an integrated network management application for managing an enterprise network, the enterprise network comprising a plurality of user computers, a help desk server, and a network visibility server, comprising the steps of:

at a first time, logging on to said help desk server using a web browser at a first one of said user computers using a service person ID, wherein a browser-based help desk interface is invoked;

at said first time, customizing said browser-based help desk window by embedding a network visibility link therein, wherein a customized browser-based help desk window is associated with said service person ID in said help desk server;

at said first time, logging out of said help desk server;

at a second time subsequent to said first time, logging into said help desk server using a web browser a second one of said user computers using said service person ID, wherein said customized browser-based help desk window associated with said service person ID is invoked; and launching a browser-based network visibility session with the network visibility server by activating said embedded network visibility link for investigating network visibility problems from said second user computer.

11. A computer program product for providing assistance to a service person in managing an enterprise network, the enterprise network comprising a plurality of user computers, a help desk server, and a network visibility server, said computer program product comprising:

computer code for providing a browser-based help desk window at any of the user computers, said browser-based help desk window providing an interface between the service person at the user computer and the help desk server;

computer code for allowing the service person to customize said browser-based help desk window by embedding a network visibility link therein; and computer code for launching a network visibility session between the service person and the network visibility server upon activation of said embedded network visibility link if the user computer contains network visibility console software associated with said network visibility server;

whereby the service person may use said browser-based help desk window at any of the plurality of user computers having a browser capability, and whereby the service person may customize said browser-based help desk window with said network visibility link at any of the plurality of user computers having a browser capability.

* * * * *